US011233804B2

United States Patent
Arzani et al.

(10) Patent No.: US 11,233,804 B2
(45) Date of Patent: Jan. 25, 2022

(54) METHODS AND SYSTEMS FOR SCALABLE PRIVACY-PRESERVING COMPROMISE DETECTION IN THE CLOUD

(71) Applicant: Microsoft Technology Licensing, LLC, Redmond, WA (US)

(72) Inventors: Behnaz Arzani, Redmond, WA (US); Selim Ciraci, Bellevue, WA (US); Stefan Saroiu, Redmond, WA (US); Alastair Wolman, Seattle, WA (US); Jack Wilson Stokes, III, North Bend, WA (US); Geoff Outhred, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 422 days.

(21) Appl. No.: 16/259,939

(22) Filed: Jan. 28, 2019

(65) Prior Publication Data
US 2020/0244674 A1 Jul. 30, 2020

(51) Int. Cl.
*H04L 29/06* (2006.01)
*G06N 20/00* (2019.01)
(Continued)

(52) U.S. Cl.
CPC ...... *H04L 63/1416* (2013.01); *G06F 9/45558* (2013.01); *G06F 21/6245* (2013.01);
(Continued)

(58) Field of Classification Search
CPC ............. H04L 63/1425; H04L 63/1416; H04L 63/1441; G06N 20/00; G06F 9/45595;
(Continued)

(56) References Cited

U.S. PATENT DOCUMENTS 10,038,703 B2 7/2018 Liu et al.
2006/0107321 A1* 5/2006 Tzadikario .......... H04L 63/0227
726/22
(Continued)

FOREIGN PATENT DOCUMENTS

EP 3429130 A1 1/2019

OTHER PUBLICATIONS

Singh, Kamaldeep, et al. "Big data analytics framework for peer-to-peer botnet detection using random forests." Information Sciences 278 (2014): 488-497. (Year: 2014).*
(Continued)

*Primary Examiner* — Syed A Zaidi

(57) ABSTRACT

A compromise detection system protects data centers (DCs) or other providers in the cloud. The compromise detection system can detect compromised virtual machines (VMs) through changes in network traffic characteristics while avoiding expensive data collection and preserving privacy. The compromise detection system obtains and uses periodically-obtained flow pattern summaries to detect compromised VMs. Agent-based detection on predetermined and compromised VMs can expose (using supervised learning) the network behavior of compromised VMs and then apply the learned model to all VMs in the DC. The compromise detection system can run continuously, protect the privacy of cloud customers, comply with Europe's General Data Protection Regulation (GDPR), and avoid various techniques that both erode privacy and degrade VM performance.

20 Claims, 16 Drawing Sheets

(51) Int. Cl.
 *G06F 9/455* (2018.01)
 *G06F 21/62* (2013.01)
(52) U.S. Cl.
 CPC ......... *G06N 20/00* (2019.01); *H04L 63/1425* (2013.01); *H04L 63/1441* (2013.01); *G06F 2009/45587* (2013.01); *G06F 2009/45591* (2013.01); *G06F 2009/45595* (2013.01)
(58) Field of Classification Search
 CPC . G06F 2009/45591; G06F 2009/45587; G06F 21/6245
 USPC .......................................................... 726/23
 See application file for complete search history.

(56) References Cited

U.S. PATENT DOCUMENTS

| | | | |
|---|---|---|---|
| 2010/0077481 A1 | 3/2010 | Polyakov et al. | |
| 2010/0115620 A1* | 5/2010 | Alme .................. | H04L 63/1416 726/24 |
| 2010/0154057 A1* | 6/2010 | Ko ...................... | H04L 65/1006 726/23 |
| 2010/0257580 A1* | 10/2010 | Zhao .................... | H04L 67/125 726/1 |
| 2013/0325787 A1* | 12/2013 | Gerken .................. | G06N 5/048 706/52 |
| 2014/0096251 A1 | 4/2014 | Doctor et al. | |
| 2015/0172321 A1 | 6/2015 | Kirti et al. | |
| 2016/0359872 A1* | 12/2016 | Yadav .................... | H04L 63/20 |

OTHER PUBLICATIONS

Ye, Xiaoming, et al. "An anomalous behavior detection model in cloud computing." Tsinghua Science and Technology 21.3 (2016): 322-332. (Year: 2016).*

NPL Search Terms (Year: 2021).*

"International Search Report and Written Opinion Issued in PCT Application No. PCT/US2019/065567", dated Feb. 28, 2020, 10 Pages.

Moshref, et al."Trumpet: Timely and Precise Triggers in Data Centers", In Proceedings of ACM SIGCOMM Conference, Aug. 22, 2016,pp. 129-143.

Narayana, et al."Language-Directed Hardware Design for Network Performance Monitoring", In Proceedings of Conference of the ACM Special Interest Group on Data Communication, Aug. 21, 2017,14 Pages.

Narudin, et al."Evaluation of machine learning classifiers for mobile malware detection", In Journal of Soft Computing, vol. 20, No. 1, Jan. 1, 2016,15 Pages.

Park, et al."Securing web service by automatic robot detection", In Proceedings of USENIX Annual Technical Conference, General Track, Jun. 2, 2006,06 Pages.

Priyadarshana, et al."Multiple Break-Points Detection in Array CGH Data via the Cross-Entropy Method", In Journal of IEEE/ACM Transactions on Computational Biology and Bioinformatics, vol. 12, No. 2, Oct. 7, 2014,pp. 487-498.

Rahman, et al."FRAppE: Detecting Malicious Facebook Applications", In Proceedings of 8th International Conference on Emerging Networking Experiments and Technologies, Dec. 10, 2012,pp. 313-324.

Ramteke, et al."Privacy Preserving & Access Control to Intrusion Detection in Cloud System", In International Journal of Innovative Research in Computer and communication Engineering vol. 1, No. 1, Mar. 2013,pp. 21-29.

Rieck, et al."Learning and Classification of Malware Behavior", Proceedings of the 5th international conference on Detection of Intrusions and Malware, and Vulnerability Assessment, Jul. 10, 2008,17 Pages.

Ristenpart, et al."Hey, You, Get Off of My Cloud: Exploring Information Leakage in Third-Party Compute Clouds", In Proceedings of ACM Conference on Computerand Communications Security, Nov. 9, 2009,pp. 199-212.

Roesch, Martin"Snort: Lightweight Intrusion Detection for Networks", In Proceedings of the 13th Conference on Systems Administration, Nov. 7, 1999,pp. 229-238.

Sekar, et al."Toward a Framework for Internet Forensic Analysis", In Proceedings of ACM HotNets-III, Nov. 2004,06 Pages.

Sherry, et al."BlindBox: Deep Packet Inspection over Encrypted Traffic", In Proceedings of ACM SIGCOMM Computer Communication Review, vol. 45, Issue 4, Sep. 22, 2015,pp. 1-22.

Singh, et al."Automated Worm Fingerprinting", In Proceedings of the 6th conference on Symposium on Operating Systems Design & Implementation, Dec. 6, 2004,pp. 45-60.

Srivastava, et al."Tamper-Resistant, Application-Aware Blocking of Malicious Network Connections", In Proceedings of 11th International Symposium on Recent Advances in Intrusion Detection, Sep. 15, 2008,pp. 39-58.

Takabi, et al."Security and Privacy Challenges in Cloud Computing Environments", In Proceedings of IEEE Security & Privacy Magazine, vol. 8, No. 1, Nov. 2010,pp. 24-31.

Viswanath, et al."Towards Detecting Anomalous User Behavior in Online Social Networks", In Proceedings of the 23rd USENIX Security Symposium, Aug. 20, 2014,pp. 223-238.

Watson, et al."Malware Detection in Cloud Computing Infrastructures", In Journal of IEEE Transactions on Dependable and Secure Computing, vol. 13, Issue 2, Mar. 2016,pp. 1-14.

Winstein, et al."TCP ex Machina: Computer-Generated Congestion Control", In Proceedings of ACM SIGCOMM Conference, Aug. 12, 2013,pp. 123-134.

Wittman, David"1000-most-common-passwords", Retrieved from: hWITTMAN,ttps://github.com/DavidWittman/wpxmlrpcbrute/blob/master/wordlists/1000-most-common-passwords.txt, Nov. 2005,20 Pages.

Ye, et al."An Anomalous Behavior Detection Model in Cloud Computing", In Journal of Tsinghua Science and Technology, vol. 21, Issue 3, Jun. 13, 2016,pp. 322-332.

Yegneswaran, et al."Using Honeynets for Internet Situational Awareness", In Proceedings of Fourth Workshop on Hot Topics in Networks, Nov. 2005,pp. 1-6.

"Azure Security Center", Retrieved from: https://azure.microsoft.com/en-us/services/security-center/, Retrieved Date: Sep. 13, 2018,11 Pages.

"Feature selection techniques in sklearn", Retrieved from: https://web.archive.org/web/20181027191735/http:/scikit-learn.org/stable/modules/feature_selection.html, Oct. 27, 2018,05 Pages.

"General Data Protection Regulation", Retrieved from: https://web.archive.org/web/20180205044005/https:/ec.europa.eu/info/law/law-topic/data-protection_en, Feb. 5, 2018,02 Pages.

"On the effectiveness of IP reputation for spam filtering", In Proceedings of Second International Conference on Communication Systems and Networks, Jan. 5, 2010,10 Pages.

"Stackdriver Logging", Retrieved from: https://web.archive.org/web/20181023061822/https:/cloud.google.com/logging/, Oct. 23, 2018,07 Pages.

"The Area Under an ROC Curve", Retrieved from: https://web.archive.org/web/20010306083840/http:/gim.unmc.edu/dxtests/roc3.htm, Mar. 6, 2001,02 Pages.

Argyraki, et al."Scalable Network-Layer Defense Against Internet Bandwidth-Flooding Attacks", In Journal of IEEE/ACM Transactions on Networking, vol. 17, Issue 4, Aug. 1, 2009,pp. 1-14.

Arzani, et al."Taking the Blame Game out of Data Centers Operations with NetPoirot", In Proceedings of the ACM SIGCOMM Conference, Aug. 22, 2016,14 Pages.

Barford, et al."An Inside Look at Botnets", In Publication of Springer-Malware Detection, Jan. 2007,20 Pages.

Bekerman, et al."Unknown Malware Detection using Network Traffic Classification", In Proceedings of IEEE Conference on Communications and Network Security, Sep. 28, 2015,pp. 134-142.

Bianchi, et al."Blacksheep: Detecting Compromised Hosts in Homogeneous Crowds", In Proceedings of ACM Conference on Computer and Communications Security, Oct. 16, 2012,12 Pages.

(56) References Cited

OTHER PUBLICATIONS

Buyukkayhan"Lens on the Endpoint: Hunting for Malicious Software Through Endpoint Data Analysis", In International Symposium on Research in Attacks, Intrusions, and Defenses, Sep. 18, 2017,22 Pages.
Chen, et al."Failure Diagnosis Using Decision Trees", In Proceedings of 1st International Conference on Autonomic Computing, May 17, 2004,8 Pages.
Chen, et al."Spatial-Temporal Characteristics of Internet Malicious Sources", In Proceedings of 27th IEEE International Conference on Computer Communications, Apr. 13, 2008,05 Pages.
Chun, et al."Netbait: a Distributed Worm Detection Service", In Intel Research Berkeley Technical Report IRB-TR-0333, Sep. 2003,11 Pages.
Claise, Benoit"Cisco Systems NetFlow Services Export Version 9", Retrieved from: https://tools.ietf.org/pdf/rfc3954.pdf, Oct. 2004,33 Pages.
Claise, B."Specification of the IP Flow Information Export (IPFIX) Protocol for the Exchange of IP Traffic Flow Information", Retrieved from <<http://tools.ietf.org/pdf/rfc5101 pdf>>, Jan. 2008,63 Pages.
Cortez,, et al."Resource Central: Understanding and Predicting Workloads for Improved Resource Management in Large Cloud Platforms", In Proceedings of 26th Symposium on Operating Systems Principles, Oct. 28, 2017,15 Pages.
Cusack, et al."Machine Learning-based Detection of Ransomware using SDN", In Proceedings of the ACM International Workshop on Security in Software Defined Networks & Network Function Virtualization, Mar. 19, 2018,06 Pages.
Deutsch, Hans-Peter"Principle component analysis", In Publication of Palgrave Macmillan, Jan. 2002,pp. 539-547.
Dietzel, et al."Blackholing at IXPs: On the Effectiveness of DDoS Mitigation in the Wild", In Proceedings of International Conference on Passive and Active Network Measurement, Mar. 31, 2016,12 Pages.
Firestone, Daniel"VFP: A Virtual Switch Platform for Host SDN in the Public Cloud", In Proceedings of 14th USENIX Symposium on Networked Systems Design and Implementation, Mar. 27, 2017,pp. 315-328.
Frei, et al."Firefox (In) Security Update Dynamics Exposed", In Journal of ACM SIGCOMM Computer Communication Review, vol. 39, Issue 1, Jan. 2009,pp. 16-22.
Gross, Jesse"Programmable Networking with Open vSwitch", Retrieved from: https://events.static.linuxfound.org/sites/events/files/slides/OVS-LinuxCon%202013.pdf, Sep. 2013,pp. 1-14.
Gu, et al."BotMiner: clustering analysis of network traffic for protocol- and structure-independent botnet detection", In Proceedings of the 17th Conference on Security Symposium, Jul. 28, 2008,pp. 139-154.
Gu, et al."BotSniffer: Detecting Botnet Command and Control Channels in Network Traffic", In Proceedings of the 5th Annual Network and Distributed System Security Symposium, Feb. 10, 2008,18 Pages.
Gupta, et al."An Empirical Study of Malware Evolution", In Proceedings of First International Conference on Communication Systems and Networks, Jan. 5, 2009,pp. 1-10.
Hao, et al."Detecting Spammers with SNARE: Spatio-temporal Network-level Automatic Reputation Engine", In Proceedings of the 18th USENIX Security Symposium, vol. 9, Aug. 10, 2009,pp. 101-150.
Hofstede, et al."SSH Compromise Detection using NetFlow/IPFIX", In Journal of ACM SIGCOMM Computer Communication Review archive vol. 44, Issue 5, Oct. 2014,pp. 20-26.
Hua, et al."Optimal number of features as a function of sample size for various classification rules", In Journal of Bioinformatics, vol. 21, No. 8, Nov. 30, 2004,pp. 1509-1515.

Huang, et al."Adversarial Machine Learning", In Proceedings of 4th ACM Workshop on Security and Artificial Intelligence, Oct. 21, 2011,15 Pages.
Huang, et al."The Socio-monetary Incentives of Online Social Network Malware Campaigns", In Proceedings of Second ACM Conference on Online social networks, Oct. 1, 2014,12 Pages.
Jacob, et al."JackStraws: Picking command and control connections from bot traffic", In Proceedings of 20th USENIX Conference on Security Symposium, Aug. 8, 2011,16 Pages.
John, et al."Heat-seeking honeypots: design and experience", In Proceedings of 20th International Conference on World Wide Web, Mar. 28, 2011,10 Pages.
John, et al."Studying Spamming Botnets using Botlab", In Proceedings of 6th USENIX symposium on Networked systems design and implementation, Apr. 22, 2009,pp. 291-306.
Joseph, et al."Detection of Malware Attacks on Virtual Machines for a Self-Heal Approach in Cloud Computing using VM Snapshots", In Journal of Communications Software and Systems, vol. 14, No. 3, Sep. 2018,pp. 249-257.
Kim, et al."Flipping Bits in Memory Without Accessing Them: An Experimental Study of DRAM Disturbance Errors", In Proceedings of ACM/IEEE 41st Annual International Symposium on Computer Architecture, Jun. 14, 2014,pp. 361-372.
Kumar, Koushal"Intrusion Detection and Prevention System in enhancing Security of Cloud Environment", In International Journal of Advanced Research in Computer Engineering & Technology, vol. 6, Issue 8, Aug. 2017, pp. 1138-1152.
Li, et al."lmproving oneclass SVM for anomaly detection", In Proceedings of the International Conference on Machine Learning and Cybernetics, Nov. 5, 2003,pp. 3077-3081.
Louppe, et al."Bayesian optimization with skopt", Retrieved from: https://scikit-optimize.github.io/notebooks/bayesian-optimization.html, Jul. 2016,14 Pages.
Manzano, et al."Dissecting the Protocol and Network Traffic of the OnLive Cloud Gaming Platform", In Journal of Multimedia Systems, vol. 20, No. 05, Oct. 1, 2014,pp. 1-18.
Mao, et al."Analyzing Large DDoS Attacks using Multiple Data Sources", In Proceedings of SIGCOMM Workshop on Large-Scale Attack Defense, Sep. 11, 2006,pp. 161-168.
Mao, et al."Neural Adaptive Video Streaming with Pensieve", In Proceedings of Conference of ACM Special Interest Group on Data Communication, Aug. 21, 2017,pp. 197-210.
Martin, et al."Fending off IOT-hunting attacks at home networks", In Proceedings of 2nd Workshop on Cloud-Assisted Networking, Dec. 11, 2017,pp. 67-72.
Matterson, et al."A nonparametric approach for multiple change point analysis of multivariate data", In Journal of American Statistical Association, vol. 109, Issue 505, Jan. 2, 2014,pp. 1-29.
Miao, et al."The Dark Menace: Characterizing Network-based Attacks in the Cloud", In Proceedings of the ACM Conference on Internet Measurement Conference, Oct. 28, 2015,14 pages.
Mirsky, et al."Kitsune: an ensemble of autoencoders for online network intrusion detection", In Journal of Computing Research Repository, Feb. 18, 2018,pp. 1-15.
Mistry, et al."Monitoring VM against Malicious Activity in Cloud", In International Journal for Scientific Research & Development, vol. 2, Issue 3, Mar. 26, 2014,pp. 602-606.
Mohaisen, et al."Chatter: Classifying malware families using system event ordering", In Proceedings of IEEE Conference on Communications and Network Security, Oct. 29, 2014,pp. 283-291.
Moore, et al."lnferring internet denial-of-service activity", In Journal of ACM Transactions on Computer Systems, vol. 24, No. 2, May 2006,pp. 115-139.

\* cited by examiner

METHODS AND SYSTEMS FOR SCALABLE PRIVACY-PRESERVING COMPROMISE DETECTION IN THE CLOUD

BACKGROUND

Data center (DC) virtual machines (VMs) are generally unprotected, and such unprotected VMs put most, if not all, data in a particular DC at risk. While some monitoring agents exist that can be used to protect VMs, such agents are typically not used due to privacy concerns. That is, current threat monitoring agents detect whether the VM has been compromised by monitoring process execution, network traffic, central processing unit (CPU) usage, and/or disk usage from inside the VM, or through VM introspection at the hypervisor, which all put owner's data at risk of privacy violation because these agents typically require access to the users data or metadata. Moreover, such agents degrade the performance of the system.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for providing a compromise detection system for the cloud. The compromise detection system can detect compromised customer logic executing in the datacenter (e.g., VMs) through changes in network traffic characteristics while avoiding expensive data collection and preserving privacy. The embodiments herein tackle a challenging problem: using periodically-obtained flow pattern summaries to detect compromised customer logic. Agent-based detection on a smaller group of predetermined and compromised customer logic can expose (using supervised learning) the network behavior of compromised customer logic and then apply the learned model to all customer logic in the DC. The embodiments can run continuously, protect the privacy of cloud customers, and comply with Europe's General Data Protection Regulation (GDPR). Embodiments further avoid various techniques that erode privacy and significantly degrade customer logic performance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1A:
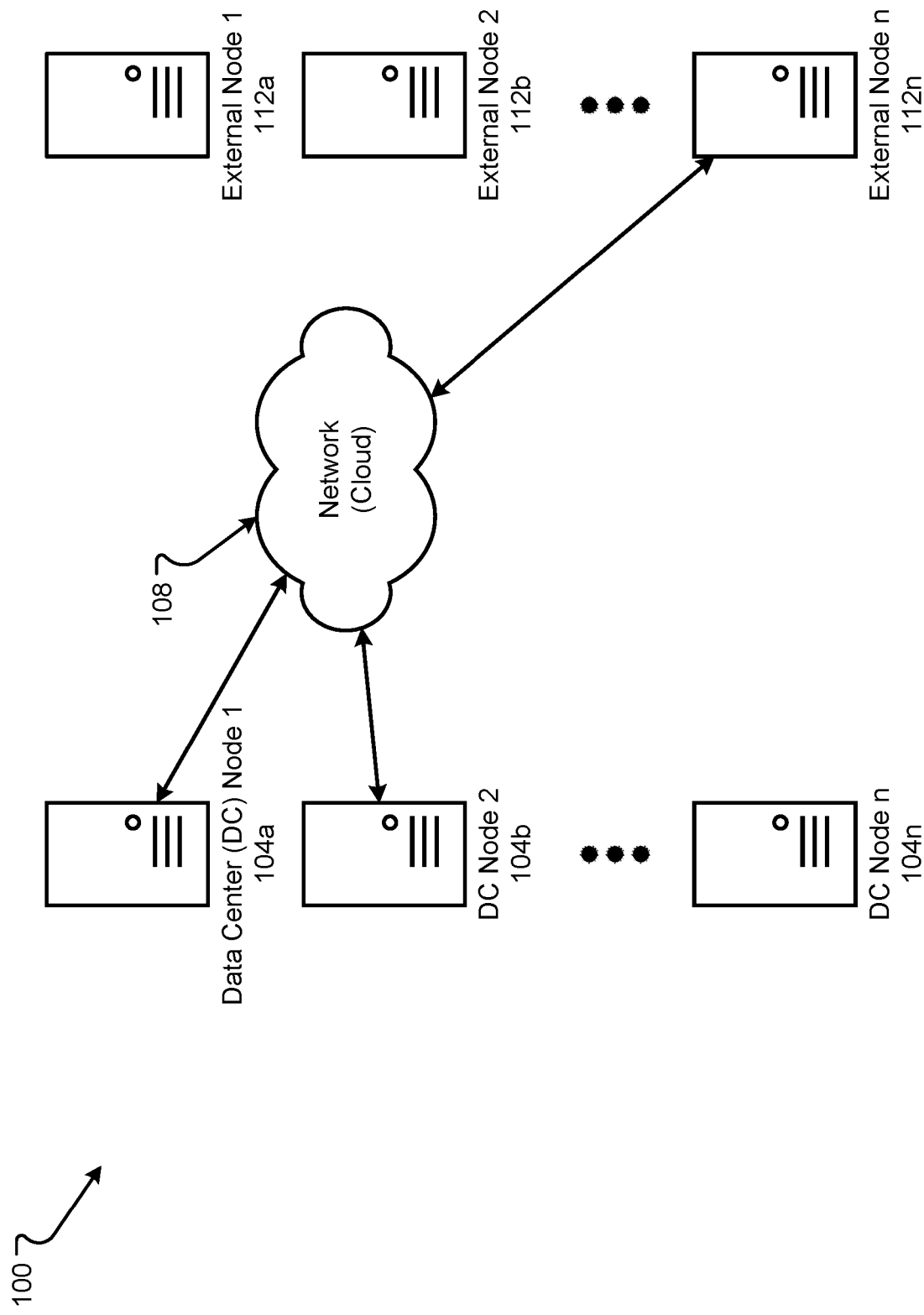
FIG. 1A illustrates a first computing environment including DC nodes where the VMs in the DC are not compromised in accordance with the aspects of the disclosure.

Embodiments herein comprise a compromise detection system for the cloud. The compromise detection system can detect compromised customer logic while avoiding expensive data collection and preserving privacy. Customer logic can be any hardware, software, or combination thereof that provides functionality to a customer or user in a datacenter. Hereinafter, the customer logic will be referred to as a virtual machine and those terms may be considered synonymous, although the embodiments are not limited to this implementation of customer logic. The compromise detection system uses periodic (e.g., 10 minute) flow pattern summaries to detect compromised VMs. Agent-based detection can be placed on a predetermined subset of VMs (e.g., VMs where access to private data is allowed) to expose and learn the network behavior of compromised VMs within the subset of VMs. Then, the compromise detection system can apply the learned model to other VMs in the DC, without requiring access to private data of those VMs. The compromise detection system may run continuously and can protect the privacy of cloud customers, can comply with GDPR mandates, and avoid any techniques that erode privacy or degrade performance.

The compromise detection system can be deployed as the first step in customer protection. Once a VM is marked as suspect, other, more expensive, algorithms, e.g., scanning virtual hard disks (VHDs) or deploying Snort or other network intrusion detection systems (NIDSs), may then be used to avoid false positives. These other algorithms cannot run continuously at scale without degrading VM performance and cannot run without customer permission, due to privacy concerns. The role of the compromise detection system is to reduce the search space and to ensure most or all customers are protected most of the time or at all times from malware or other nefarious code or conduct.

Too many alerts can erode customer trust in the compromise detection system. To avoid unnecessary checks, the compromise detection system can assign confidence scores to each detection to allow operators to gauge when more inspection is necessary. Attackers may attempt to avoid detection by modifying malware. Given the compromise detection system's ability to detect continuously, the compromise detection system can be continuously retrained to adapt to such changes in the malware. Although retraining may not be sufficient in all cases, the compromise detection system is still beneficial as the compromise detection system increases the difficulty for attackers to damage other VMs in the DC and/or the DC infrastructure.

The embodiments have several technical advantages, for example:

- A compromise detection system is cloud-based and uses periodic flow summaries to find compromised VMs. The compromise detection system operates without packet captures, without deep packet inspection (DPI), without using IP addresses, without fine-grained per-packet data, and without visibility into the VM. The challenge that the compromise detection system addresses is to achieve acceptable detection accuracy without access to such detailed information (even at the network layer), which preserves the user's privacy.
- The compromise detection system is a scalable implementation that can run on every host across all or most DCs of a major cloud provider. The compromise detection system can collect network-level data through queries to an interface between the VM and the network or communication system of the datacenter. The interface can include any hardware, software, or combination thereof that provides communication capabilities from the VM to the datacenter network, out of the datacenter network, etc., for example, a virtual switch application (vSwitch) that is co-located on the same host. Hereinafter, the interface between the VM and the network of the datacenter will be referred to as a virtual switch or "vSwitch," and those terms may be considered synonymous, however, the embodiments are not limited to this implementation.
- The methods can summarize coarse-grained traffic patterns of individual VMs into features that the compromise detection system's machine learning (ML) model can use for detection and that can protect customer privacy to the greatest extent possible.
- In recent tests of a deployed compromise detection system, the compromise detection system's performance, using data from a large cloud provider, showed that the compromise detection system could detect 95% of all compromised VMs, with only a 1% false positive rate.

Detection of Corrupt VMs Using Traffic Flow Data:

To corrupt a VM, malicious code needs to be co-located with the victim. Attackers are likely to exploit compromised VMs (e.g., those belonging to a botnet) co-located with the target to mount these attacks. Access to a VM in the cloud may allow attackers to bypass access control lists (ACLs) and firewalls that only protect VMs from external attackers. A compromised VM may attempt to compromise other VMs. Other activities, such as, sending spam, scanning for open ports, and mining digital currency are also common when a VM is compromised. The magnitude of the problem with compromised VMs scales with the size of the DC.

Unfortunately, attackers have simple methods to acquire access to VMs in the DC, such as, running brute force attacks on VMs. Even today, these types of attacks continue to pose a menace to DCs. Typically, a VM can be subject to repeated login attempts by nefarious actors. Further, the time to discovery (the time from when the VM is deployed to the time of the first secure shell (SSH) login attempt is made with malicious intent) of a new VM by a nefarious actor is generally in minutes or hours. Generally, the time needed for a fresh VM to receive a malicious first SSH login attempt varies substantially; however, the time is generally within minutes. For example, in a test conducted by the Applicants, some VMs were discovered by attackers in 11 minutes or less, more than half of the VMs were discovered in less than half an hour. These results illustrate that VMs are under constant threat and constant and periodic checking by the compromise detection system should be a necessity.

Unfortunately, many VM owners currently fail to use strong passwords on their VMs. Such weakly-protected VMs are most susceptible to SSH brute force attacks. Provider portals can enforce strong passwords, but many users disable/change passwords once the VM is created to facilitate ease of use or automated access. In other tests conducted by the Applicants, the minimum time to compromise (e.g., the time from when the VM was instantiated to when the first successful login attempt occurred) was 5 minutes or less, with a maximum time to compromise of 47 hours. Once compromised, these VMs remained active for another 3 hours.

When compromised, a VM's communication or data flow patterns change. For example, in other tests conducted by the Applications, almost all compromised VMs changed their default Domain Name System (DNS) server from that of the provider. A number of the compromised VMs connected to the same set of external IPs (potentially command and control (CC) servers). Some had multiple connections on the reserved port for network time protocol (NTP) (123) to non-NTP servers.

In a single VNet, most VMs exhibit similar behaviors. A VNet is a virtual network set up by a user to connect the user's VMs. When compromised, VMs in these VNets often exhibit deviations from the typical behavior of other VMs in the same VNet. The compromise detection system can analyze a fraction of a VM's flows (in periodic epochs) to other VMs in the same VNet, as compared to IPs outside of the DC. The compromised VM generally deviates from the normal VNet behavior and the deviation becomes more pronounced and significant over time.

The change in behavior is also observable in the VM's temporal behavior. Typically, the volume of traffic sent by each VM in the VNet to individual IPs is often close to the VNet average. A compromised VM, however, exhibits increased deviations from the mean volume, especially over time. Thus, it is evident that a VM's connection patterns change once compromised.

Figure 1B:
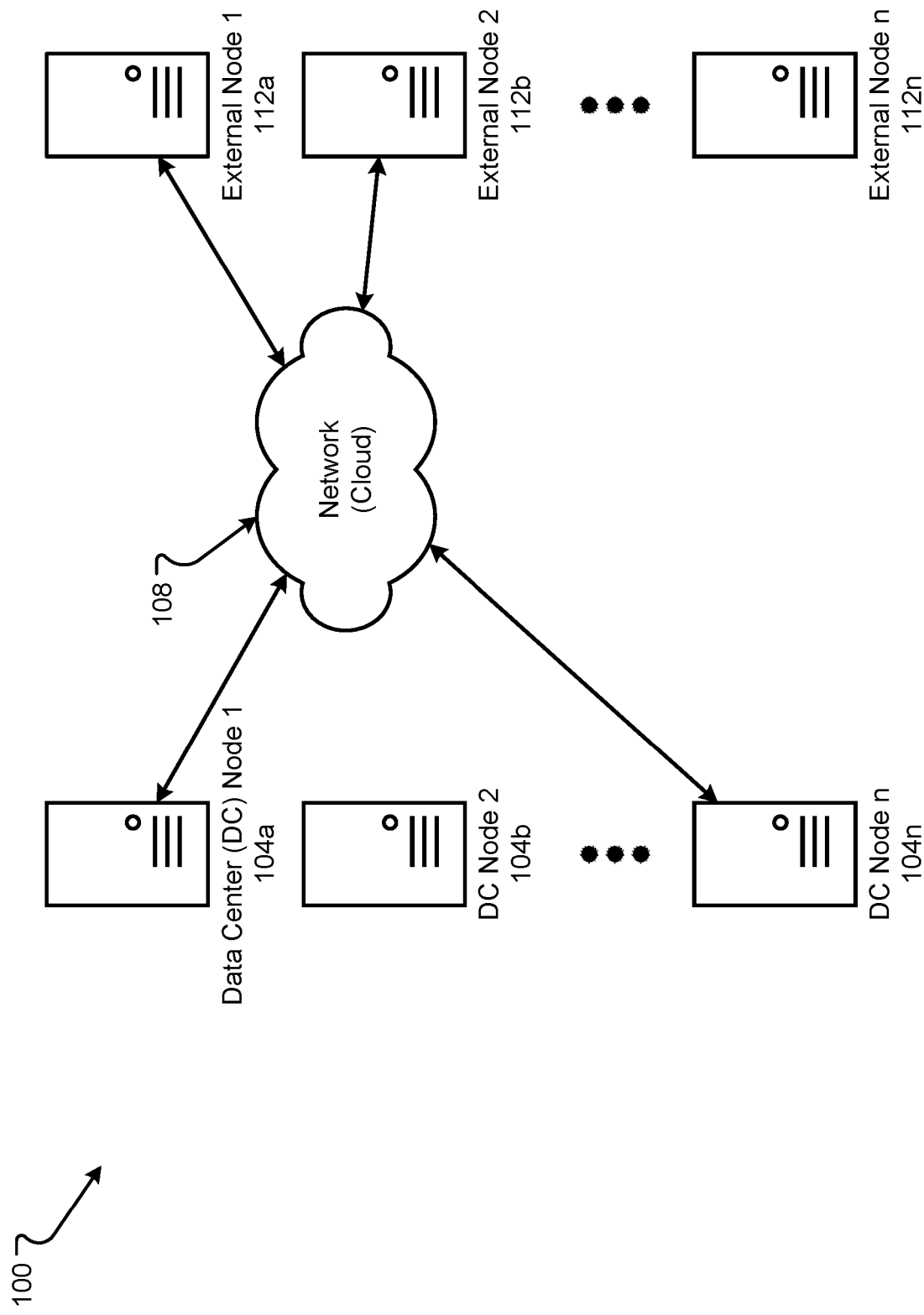
FIG. 1B illustrates a second computing environment including DC nodes where the VMs in the DC are compromised in accordance with the aspects of the disclosure.

Example configurations of a computing environment 100 are shown in FIGS. 1A and 1B. The environment 100 can include one or more nodes 104a through 112n. A node 104, 112 can include any portion of an external computing system or data center. A data center node 104a-104n can include an entire data center, one or more servers or services within the data center, or one or more virtual machines running in the data center. Thus, the data center node 104 can include any system, hardware, and/or software that provides a division or portion of the data center capabilities and that can act or function as a node or wholly separate computing device, virtual machine, or system. An external node 112a-112n similarly can be any hardware and/or software being executed outside of the data center.

The data center nodes 104 and external nodes 112 may be connected by a network 108. The network 108 can be any type of network including, but not limited to, a local area network (LAN), a wide area network (WAN), a wireless LAN (wLAN), the Internet, etc. The network 108 may include or be as described as in conjunction with FIGS. 10 through 13. The network 108 can use any technology, format, or protocol to provide communication capabilities to the nodes 104, 112.

A first example of communication flow in the environment 100 may be as shown in FIG. 1A. In this configuration, the DC node 1 104a may be currently compromised. When compromised, DC node 1 104a may communicate to DC node 2 104b and external node n 112n. The characteristics of the communication flows, as characterized in bytes per second (BPS) (although bytes per second may be used in some configurations), packets per second (PPS), ports, IP addresses used, etc. may be common to DC center node 1 104a when operating properly and compromised.

The change in the network flow pattern and characteristics when DC node 1 104a is compromised may be as shown in FIG. 1B. In this configuration, DC node 1 104a may change communication patterns, the amount of BPS into or out of the DC node 1 104a, the amount of PPS into or out of the DC node 1 104a, the ports used, and/or other characteristics. For example, DC node 1 104a may begin to communicate with external node 1 112a and/or external node 2 112b. Further, the c compromised DC node 1 104a may begin communicating internally to other data center nodes (to c compromise those other DC nodes), for example, DC node n 104n. This change in communication characteristics may indicate that DC node 1 104a is compromised based on the communications characteristics changing from that shown in FIG. 1A to that shown in FIG. 1B. For example, DC node 1 104a may communicate with DC node n 104n in an attempt to compromise DC node n 104n. Further, information improperly extracted from DC node 1 104a, or other nodes 104 within the data center, may be sent to actors external to the data center, for example, external node 1 112a and/or external node 2 112b. The traffic flow pattern shown in FIG. 1B may have different characteristics or features that represent a signature that can identify when a VM or node is compromised. Thus, by learning the features and characteristics of the traffic flow pattern of a compromised DC node 1 104a, the compromise detection system can determine when a node or virtual machine, within the data center, is compromised and may mitigate the damage done to both the virtual machine and other virtual machines within the data center.

Figure 2:
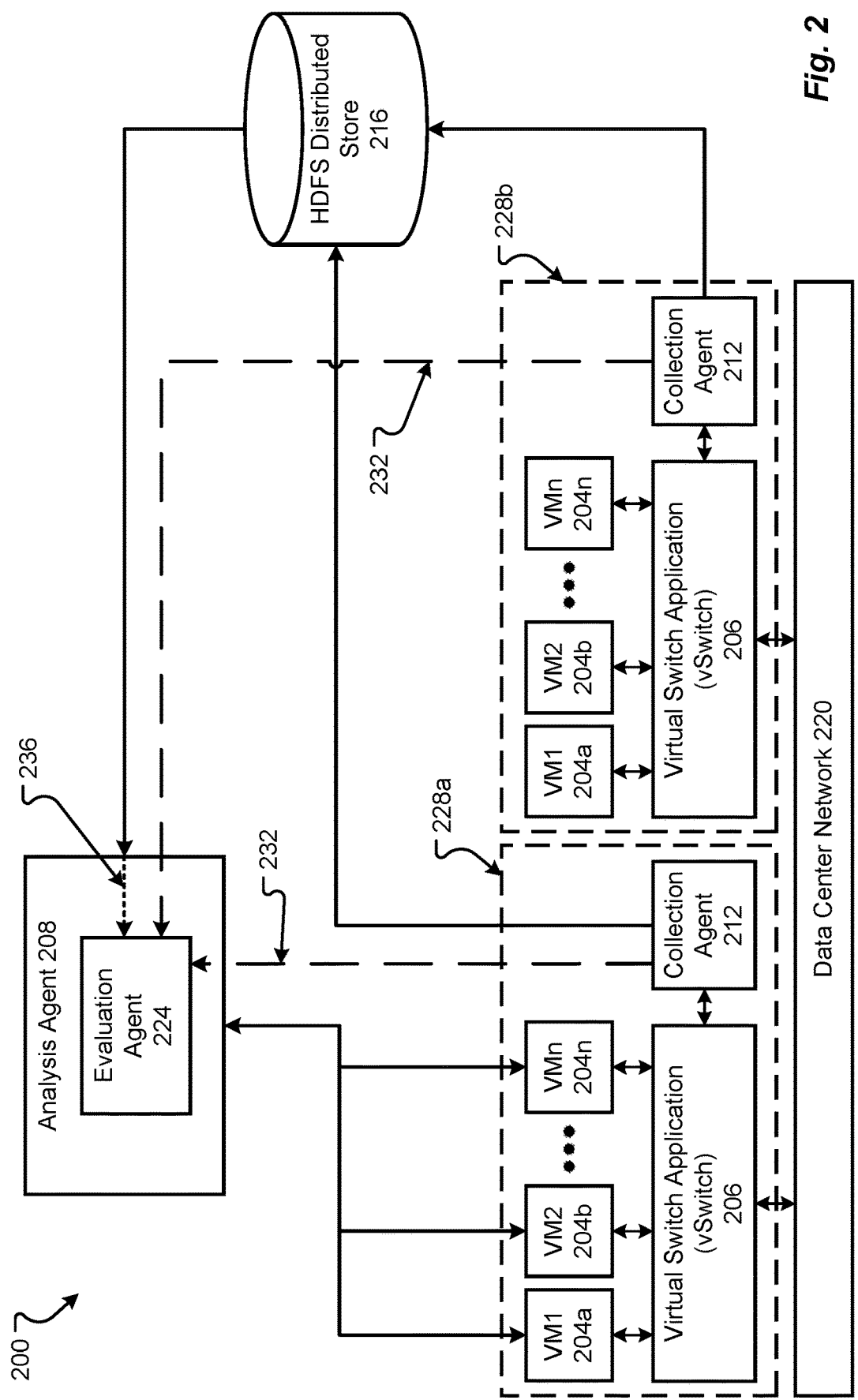
FIG. 2 illustrates the data center with a compromise detection system in accordance with the aspects of the disclosure.

Compromise Detection System:

An embodiment of the compromise detection system 200 may be as shown in FIG. 2. The compromise detection system 200 may be executed on one or more servers or other type of computing device, for example, the devices as described in conjunction with FIGS. 10-13. The compromise detection system 200 can be a type of application that receives data and executes a threat detection analysis on virtual machines 204a-204n, in one or more data center nodes 228a, 228b, for a data center or other cloud computing service. The compromise detection system 200 can include any hardware and/or software necessary to conduct the operations described herein. An example configuration of components associated with system 100, which may be embodied in hardware and/or software, may be as shown in FIG. 2.

The threat model of the compromise detection system 200 is similar to that of other infrastructure services. No VM 204 is trusted as a VM 204 can run arbitrary code. The hypervisors, network, and hardware are assumed to be trusted. The data provided to the compromise detection system 200 is also trusted. To train the compromise detection system 200, the compromise detection system 200 can rely on agent-based systems deployed on a subset of VMs 204. This subset of data can set the ground truth and provide labels during training for the supervised learning model. While the compromise detection system 200 may assume that this data cannot be faked, manipulated, or altered, the data can contain false positives due to inaccuracies in the agent-based detection systems. Finally, the compromise detection system 200 may assume that malware can have a first signature when running in emulation mode and that such malware could act differently when running in a sandboxed environment.

The objectives for the compromise detection system 200 can include running continuously. A VM 204, when compromised, may attempt to cause damage to other co-located users, other VMs 204 in the same DC, or the DC infrastructure. Thus, it is important to detect a compromised VM 204 as soon as possible to minimize the impact of the corruption. The compromise detection system 200, thus, continuously monitors a VM's connection pattern(s) and makes recommendations about whether the VM 204 is compromised periodically (e.g., every 10 minutes).

Another objective of the compromise detection system 200 is to ensure and enforce strong privacy. The European law on data privacy (the GDPR) has recently come into effect. Any personally identifiable information (PII) stored by a provider must be tracked in case the customer requires to inspect (or delete) it. In some circumstances, this PII data has to be deleted from all company data-stores, for example, after 30 days. GDPR makes it harder to sustain solutions that use PII data. Compromise detection system 200 relies on periodic flow pattern summaries, ignores specific IPs, and avoids storing PII data.

Further, the compromise detection system 200 should have low recurring operating costs. As desired from most monitoring systems, the compromise detection system 200 should have low run-time performance overhead (in terms of CPU and memory usage). Agent-based detection uses extensive monitoring. The compromise detection system 200 can have a more restricted view of the VMs 204 and is expected to make more mistakes. To avoid unnecessary performance penalty on a large number of customers, the compromise detection system 200 can be used as a preliminary detector. The detections from the compromise detection system 200 can be followed by more expensive investigations. Thus, a goal of the compromise detection system 200 is to reduce monitoring overhead and operational complexity and to allow for all VMs 204 to be protected without the need for customer permission until additional investigation is deemed necessary.

The compromise detection system 200 can run continuously on all hosts. Data collection and classification algorithms for the compromise detection system 200 handle the scale of a global cloud with low overhead. To protect customer privacy, when considering network behavior, the compromise detection system 200 need not use specific IP addresses or endpoint names to construct features. All privacy sensitive network fields are anonymized using a keyed-hash message authentication code (HMAC) during data collection and deleted as soon as the features are constructed.

The components of the compromise detection system 200 may be part of or executed by one of more computing devices and/or the servers of the data center. For example, the compromise detection system 200 may execute one or more of, but is not limited to: a collection agent (CA) 212, which is responsible for collecting network information about guest VMs 204, a Hadoop Distributed File System (HDFS) distributed store 216, the networking virtual switch (vSwitch) 206, an analysis agent (AA) 208. The compromise detection system 200 can transform raw communication data into threat features and train the evaluation agent 224, the agent-based compromise detectors (not shown), and/or an evaluation agent 224 (also referred to as a classifier). The particular division and or arrangement of components is not limited to the arrangement shown in FIG. 2, but may be reorganized based on the needs of the process, system, etc. Further, there may be more of fewer components than those components 204-220 shown in FIG. 2. Each of the components 204-220 may conduct functions as described hereinafter.

The compromise detection system 200 can include a collection agent 212 that may communicate with one or more vSwitches 206 within data center nodes 228a, 228b. The collection agent 212 can communicate with or store data within HDFS distributed store 216. The data stored in the HDFS distributed store 216 may then be provided to the analysis agent 208. In other configurations, the CA 212 can communicate directly with the AA 208. The analysis agent 208 may evaluate the received data to create threat features or characteristics of compromised virtual machines 204. These features may then be presented to an evaluation agent 224 in connection 232 and/or 236. The evaluation agent 224 may then determine, based on the threat features or characteristics, other virtual machines 204 that may be compromised or corrupted by malware.

The threat features or characteristics of the corrupted virtual machines 204 may be extracted from data provided by the vSwitch 206 based on communications to a data center network 220. As such, the received data is indicative of traffic flow patterns within the data center or between the virtual machine 204 and other nodes or devices and systems in communication with the virtual machine 204.

As shown in FIG. 2, the nodes 228a and 228b may function differently in the compromise detection system 200. Node 1 228a may provide data to help train the evaluation agent 224. Thus, the collection agent 212 can send network flow data to the HDFS distributed store 216 for the VMs 204 in the node 228a. Further, the analysis agent 208 can communicate with the VMs 204a-204n in the node 228a. The contact with the nodes 204 can be to a agent-based system that can provide indication of whether the VM 204 has been compromised. Thus, the VMs 204 in node 1 228a can include the data center's own nodes or 3rd party nodes (either having or not having an agent-based detection system) where the 3rd party has agreed to allow the analysis agent 208 view private data. Thus, the traffic flow data from the CA 212 in node 1 228a can be associated with VM data to generate the label data for training the evaluation agent 224.

In contrast, node 2 228b may include at least one VM 204 that does not provide training data but is monitored by the evaluation agent 224. Therefore, node 2 228b can represent the data center 228a at another time during runtime, can represent another group of VMs 204 in the same data center 228a, or may represent a different data center from node 1 228a. Regardless, the configuration of node 2 228b shows the communication of traffic flow data from the vSwitch 206 to the CA 212 (or directly to the evaluation agent 224), then from the CA 212 to the HDFS distributed store 216 or to the evaluation agent 224 by connection 232. In some configurations, the evaluation agent 224 pulls the runtime data from the HDFS distributed store 216, as represented by connection 236. The evaluation agent 224 may then evaluate the runtime data to determine if a VM 204 in node 228b is likely compromised.

It should be noted that the evaluation agent 224 can make this evaluation periodically (e.g., every 10 minutes, every minute, every hour, etc.) and use data that is associated with some duration (e.g., data for 10 minutes of traffic, data for 1 minute of traffic, data from 1 hour of traffic). Thus, the evaluation agent 224 can continuously analyze the traffic flow data. Further, the analysis may cover a moving window of traffic flow data, for example, a 10-minute duration amount of traffic flow data is analyzed, by the evaluation agent 224, every 1 minute. In some configurations, the analysis by the evaluation agent 224 is event-based. Thus, a change in the traffic flow characteristics triggers the CA 212 to collect traffic flow data and send the data to the evaluation agent 224 for analysis.

The various components of the compromise detection system 200 may be as described hereinafter. For example, the collection agent 204 may be as described in FIG. 3; the analysis agent 28 may be as described in FIG. 4; and the evaluation agent 224 may be as described in FIG. 5. The data collected and stored in the HDFS distributed store 216 may be as shown in FIGS. 6A and 6B. The methods or processes executed by the various components 204 through 220 may be as described in conjunction with FIGS. 7 through 9.

Figure 3:
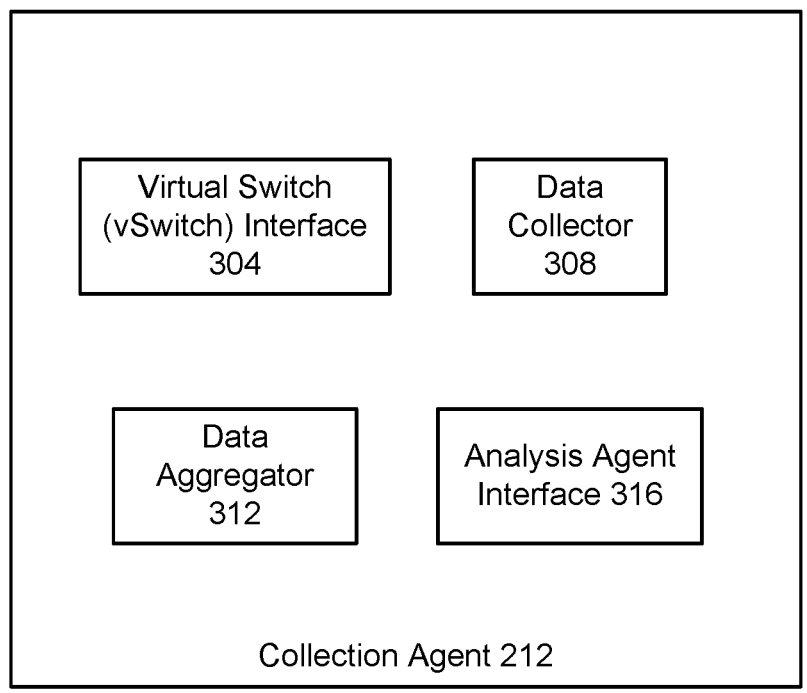
FIG. 3 illustrates a collection agent for collecting data on traffic flow patterns for virtual machines in the data center in accordance with the aspects of the disclosure.

Collection Agent:

An embodiment of a collection agent 212 may be as shown in FIG. 3. The collection agent 212 may include various hardware and/or software. Generally, the compromise detection system 200 should avoid installing any application inside the customer's guest VM 204, conducting any operation that requires customer permission (e.g., VM introspection), or executing processes that violate privacy. Thus, the CA 212 can run in user space without any changes to the host kernel. The CA 212 can use existing features of the host networking stack exposed by the vSwitch 206 deployed on all hosts. The CA 212 can collect high-level flow data about guest VMs 204 and can store that data in the HFDS distributed datastore 216.

Although both the CA agent 212 and the AA agent 208 use detailed VM 204 introspection techniques (to train the evaluation agent 224), the compromise detection system 200 can still meet privacy requirements. The training of the evaluation agent 224 can use information gathered from guest VMs 204 or the cloud-provider's VMs 204, as shown in data center 228a, where introspection is safe for privacy requirements. There is no privacy compromise in performing introspection on VMs 204 of the data center because the DC provider owns those VMs 204; the other VMs 204 used for training are accessed when those customers have explicitly given their permission. Meanwhile, VMs 204 in other data centers 228b may not be used for training (although retraining on VMs 204 identified as compromised may be possible) to maintain the privacy of those VMs 204, but, the network behavior of those VMs may be reviewed to identify compromises.

The collection agent 212 may include one or more of the following, but is not limited to, a vSwitch interface 304, a data collector 308, a data aggregator 312, and/or an analysis agent interface 316. Each of these components 304 through 316 perform various functions that will be described hereinafter.

The virtual machine switch interface 304 can communicate with the vSwitch 206 in node 228. Thus, the virtual switch interface 304 can include any type of communication hardware including receivers, transmitters, transceivers, etc. In some configurations, the virtual switch interface 304 can include software that communicates with the vSwitch 206 based on any type of protocol or format. The virtual switch interface 304 therefore can receive data from the vSwitch 206 and provide that data to the data collector 308.

The vSwitch interface 304 can gather network level summaries. The collection agent 212 can be deployed on all hosts 228 across all DCs of a major cloud provider and collect data about the network behavior of guest VMs 204 from the vSwitch 206 that runs on each host 228. Privacy-sensitive fields, such as the IP address and the virtual network (VNet) identifier (ID) (VnetID), are anonymized. The CA 212 runs continuously and polls the vSwitch 206 periodically, e.g., every 10 seconds, to extract the flow records. The vSwitch 206 records this data, e.g., number of packets sent, for each flow of each VM 204, throughout the period. A choice of 10 second periods, for the polling period, typically does not result in any data loss. The period should be chosen to be large enough to keep CPU usage low.

The virtual switch interface 304 to the vSwitch 206 can use read locks while reads are taking place. Thus, even though the vSwitch 206 has higher priority to obtain the lock, the virtual switch interface 304 limits queries, e.g., to 5,000 flows per period and per VM 204, to reduce the impact of contention. If the total flows within the polling period exceed this limit for a given VM 204, the vSwitch 206 can indicate the total number of flows, which is then recorded by data collector 308. A 5,000 limit can result in a data loss of 4% of the data points with more than 5,000 flows. The compromise detection system 200 can effectively detect compromised VMs 204 despite this limit.

The data collector 308 may anonymize or abstract whatever data needs to be kept private. Data collector 308 may then collect the data in a data structure 600, as described in conjunction with FIG. 6A. Thus, the data collector 308 may create the data structure 600 found in FIG. 6A and also provide the data to the data aggregator 312.

The data aggregator 312 can consolidate the data by eliminating unneeded fields or information or combining information into a more understandable form. The data aggregator 312 may then packetize the data to provide to the analysis agent interface 316. The aggregation can be applied to fields that store bits, bytes, packets, and flows, and can aggregate flows based on their destination port.

The analysis agent interface 316 can send the data collected to the analysis agent 208 and/or to the HDFS distributed store 216 for storage for later provision to the analysis agent 208. Each batch of data can be then uploaded as JavaScript Object Notation (JSON) files. The analysis agent interface 316 may then provide any communication interface required, including any type of protocol or format, for providing the information to the data server managing the HFDS distributed datastore 216. Thus, the analysis agent interface 316 provides communication from the collection agent 212 to the HFDS distributed store 216 or the analysis agent 208, as is necessary.

The CA 212 is an improvement over existing technologies, for example, IPFix. These pre-existing systems are used for traffic engineering, DDOS protection, and other management tasks. The pre-existing systems run on core routers (in the operator's DCs) in the DC and sample 1 out of 4096 packets traversing the network core. Because of this sampling, the pre-existing systems are biased towards monitoring "chatty" VMs and "elephant" flows. Also, the pre-existing systems do not capture flows that do not traverse the network core. Therefore, IpFix and other pre-existing systems may not adequately provide data for the compromise detection system 200, which requires more complete knowledge of per-VM flow patterns. Further, the compromise detection system's accuracy drops when the flows are significantly down-sampled.

Other in-network monitoring systems are also inadequate as these other in-network monitors require a specific type of sampling not suitable for the compromise detection system 200 or require hardware upgrades in the network currently not possible. The compromise detection system 200 can limit the number of records extracted in each period. This limit also results in occasional data-loss. However, the collection agent 212 does not suffer from the same problems described above. The limit is applied to each VM 204 separately, thus, not biasing the data set towards chatty VMs 204. The data is captured from the host's vSwitch 206 and has all records for the VM's flows irrespective of where the flows are routed. The CA 212 can be a software component on the host and requires no hardware changes. Finally, the CA 212 has low overhead—for example, usage of only 0.1% of the host CPU and a max of 15 MB of random access memory (RAM).

Figure 4:
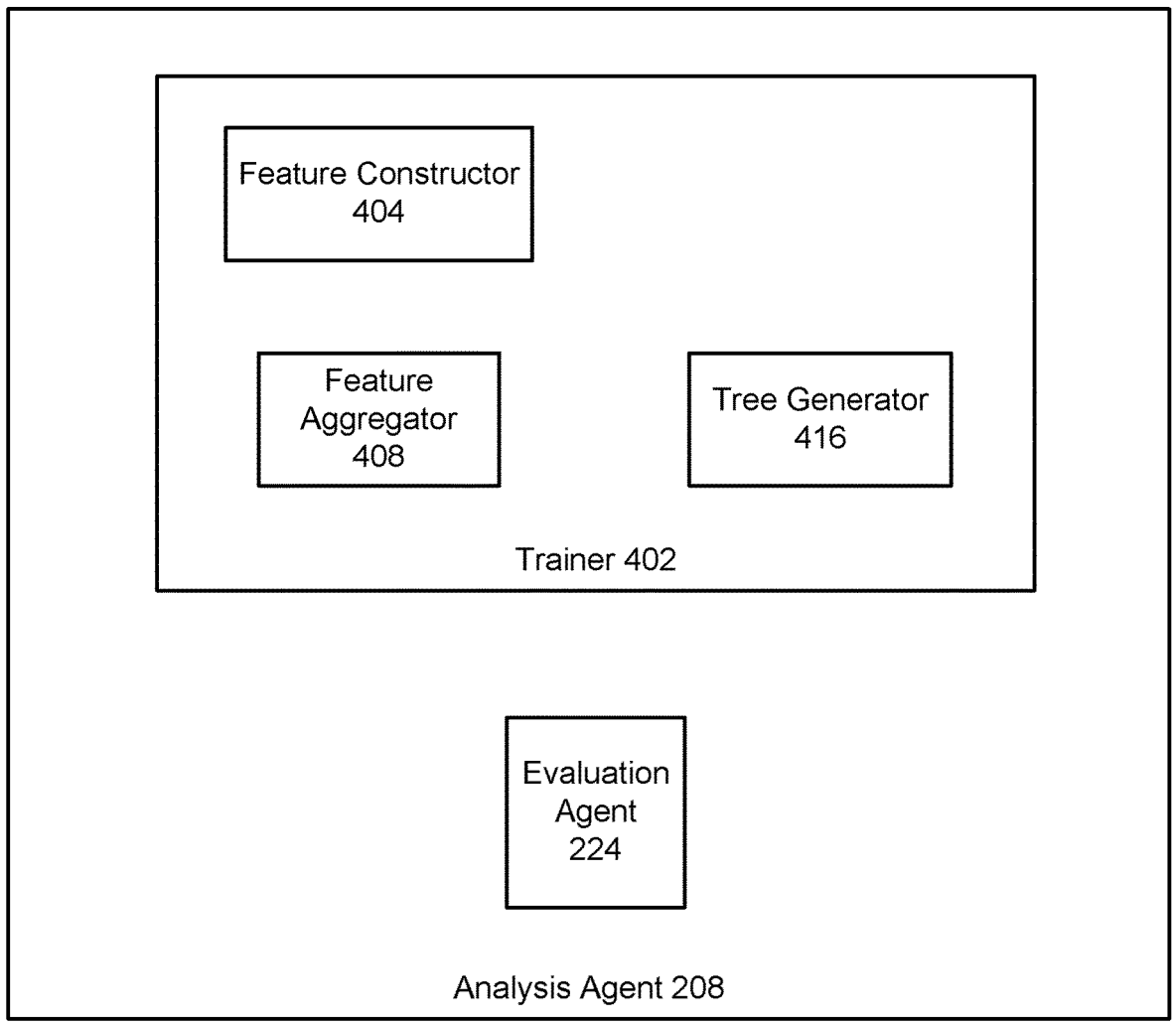
FIG. 4 illustrates an analysis agent for analyzing data on traffic flow patterns for virtual machines in the data center in accordance with the aspects of the disclosure.

Analysis Agent:

An embodiment of the analysis agent 208 may be as shown in FIG. 4. The analysis agent 208 may also be embodied in any type of hardware and/or software. The AA 208 is responsible for training the evaluation agent 224 (which may be a machine learning (ML) classifier) based on 1) the flow patterns collected by the CAs 212; and 2) "ground-truth" data about which VMs 204 are compromised based on two separate agent-based detection systems that are already deployed. The first agent-based detection system, referred to above, may be deployed as a "1$^{st}$ Party Detector", which is an agent that the cloud provider installs on their own ("1$^{st}$ Party") VMs 204. The second agent-based detection system referred to as the "3$^{rd}$ Party Detector", and is an opt-in agent that is provided as the cloud provider's public security offering, which may be deployed on VMs 204 not owned by the cloud provider ("3$^{rd}$ Parties").

The AA 208 can include one or more of, but is not limited to: a trainer 402 and an evaluation agent 224. The trainer 402 generally trains or determines the features of a compromised virtual machine 204. The evaluation agent 224, in comparison, can evaluate current VMs 204, running on the node 228b, and determine if any nodes or VMs 204 are compromised in the data center 228b. Thus, the evaluation agent 224 applies the trained threat features, determined or characterized by the trainer 402, to do analysis for the data center on all the VMs 204 functioning within different nodes 228*b* within the data center.

The trainer 402 can include one or more of the following, but is not limited to: a feature constructor 404, a feature aggregator 408, and/or a tree generator 416. Each of these various components 404 through 416 will now be explained hereinafter. The feature constructor 404 can obtain the collected data either from the collection agent 212 or by retrieving that data from the HDFS distributed store 216. From the data 600, the threat features of compromised virtual machines 204 may be determined. Thus, the training data set may be provided to the feature constructor 404. Any compromised virtual machine 204 may be indicated to the feature constructor 404 by agent-based analysis. The communications or data flows from that compromised virtual machine 204 can be analyzed and the data that characterize the new type of traffic flow may be identified and stored in data structure 672, as is shown in FIG. 6B. The number of virtual machines 204 that need to be evaluated and identified as compromised is small and thus not every customer within the data center needs to provide access to their virtual machines 204. In this way, a smaller data set can be used to identify the threat features, which then can be used by the evaluation agent 224 to identify other compromised virtual machines 204.

The feature aggregator 408 can aggregate or combine different features. Thus, there may be combinations of two or more features that can together indicate a compromised virtual machine 204. For example, increased bytes per second and a set of IP features, which together indicate that the VM may be compromised, may be aggregated into a single measure by the feature aggregator 408 to show a VM 204 is compromised. Any of these features alone may not necessarily indicate a compromised VM 204, but, when put together or aggregated, the feature pattern provides an indication that the virtual machine 204 has been comprised. The feature aggregator 408 may then store these aggregated features, or indications of which features to aggregate, in data store 672, as described in conjunction with FIG. 6B.

The tree generator 416 can identify and construct the evaluation trees to classify different data and provide the ability for the evaluation agent 224 to employ random forest analysis to determine compromised virtual machines 204. There may be several different evaluation trees to identify possibly compromised virtual machines 204 and these separate and varied evaluations of the separate tree data can represent portions or fractions of all trees that can indicate a level of compromise of a virtual machine 204.

The evaluation agent 224 provides the ability to evaluate other virtual machines 204 based on feature sets and the trees constructed by the trainer 402. The evaluation agent 224 may use the data collected by the collection agent 212, from virtual machines 204, to evaluate the current traffic patterns. If a traffic pattern of a virtual machine 204 is evaluated as having similarity to features of past compromised virtual machines, this evaluation may be given some type of confidence score or indicate a possibility of compromise, then, the compromised detection system 200 can, either automatically or through user intervention, allow for the mitigation of these compromised virtual machines 204. Thus, the evaluation agent 224 can provide a means or the ability to shut down or quarantine virtual machines 204 that seem compromised or to provide an indication that further analysis may be needed on these virtual machines 204 and allow for that further evaluation and then mitigation.

The AA 208 generally has two roles: (1) to train the evaluation agent 224 (also referred to as a classifier) to be able to recognize, using network data, which VMs 204 are compromised, and (2) to run the classifier 224 and predict which VMs 204 are suspicious. The data used may be as shown in the data structure 600 described in conjunction with FIG. 6A The AA 208 generally uses two sources of labeled data. One source is from 1st Party Detectors. Cloud providers often run a variety of services on their own as self-managed VMs 204. These services include web servers, database servers, caches, CDNs, lambda type services, etc. The provider owns these VMs 204, which often have in-kernel instrumentation for detecting compromise. Data from these detectors is used for training. The second source of labels is from 3rd Party Detectors. Cloud providers have a vested interest in protecting 3rd-party VMs 204 and often offer similar security tools to their customers like the ones they use to protect their 1st-party VMs. If customers opt-in, the 3rd Parties can deploy and run these tools inside their own VMs 204. The AA 208 also uses data from the opt-in 3rd-party detectors. However, the requirement of customer opt-in makes these 3rd-party detectors much less common.

The feature patterns observed when subset of VMs 204 are compromised often repeat when other VMs 204 are compromised. The AA 208 can construct two or more types of features including one or more of the following, but not limited to: IP-based features, port features, and aggregate features. IP-based features describe the set of IP addresses to which a VM 204 connects. Generally, a VM's behavior changes when compromised—the VM 204 contacts a different set of IPs than before, and the VM 204 uses different port numbers. Constructing IP-based features has two challenges. The first challenge is privacy: the IPs have to be anonymized. Therefore, the feature constructor 404 cannot map IPs geographically or classify them according to which autonomous system (AS) the IP belongs. Second, the space of IPs is large, and this leads to a large number of features. It would require a huge volume of training data to learn whether a compromised VM 204 is likely to contact a specific IP. While identifying malicious flows is useful when implementing ACLs and firewalls, it is hard to identify whether a VM 204 is compromised if only a fraction (especially a small fraction) of its connections are identified as suspect.

Instead, the feature constructor 404 uses domain knowledge to summarize flow-level information into temporal and spatial features. The intuition behind this approach is that to detect changes in a VM's connection pattern. An ML algorithm should be able to describe the evolution of the graph both in time and space and to compare the graph not just with the historical behavior of the VM 204 itself but to the behavior of other VMs 204 as well.

The feature constructor 404 can also create temporal features. These temporal features capture how a VM's flow patterns change over time both compared to itself and other VMs 204. To summarize the flow pattern and its evolution, the feature constructor 404 can create a binning of each individual flow. For example, the feature constructor 404 can construct four different cumulative distribution functions (CDFs) to create these bins. These CDFs are: for each VM 204, the distribution of each connection according to the connection's "BPS out" over the course of a period of time; for each VM 204, the distribution of all connections according to their "BPS out" over the course of a period of time; for each remote IP, the distribution of all connections to that IP address across all VMs 204 in the DC according to their "BPS out" over a period of time; and/or for each remote IP, the distribution of all edges connecting to that IP address across all VMs 204 in the DC according to their "BPS out" in a period of time. These CDFs describe a VM's flows throughout time as compared to itself and other VMs in the same region. We then divide each CDF into five buckets: top 1%, top 10%, middle, bottom 10%, and bottom 1%. Each connection is then projected to a lower dimension based on the bucket the connection falls into on each of these four CDFs.

Other threat features include spatial features. To capture the spatial characteristic of a VM's connection graph, the feature constructor 404 can classify each edge in one of three categories based on the VM's endpoints: (a) both are in the same VNet; (b) both belong to the same cloud provider (but different VNets); and/or (c) one of the end-points is an external IP. The feature constructor 404 then aggregates each metric for each of these groups and removes all IP/VNet information from the dataset.

Further, the feature constructor 404 can create port features. A connection's destination port can help identify the application protocol being used. Often attackers/malware use specific protocols for communication (e.g., malware's communication with a CC). Typically, the set of protocols used by the VM 204 changes once the VM 204 was compromised. For example, there are 32 ports of interest including ports 22 (SSH), 53 (DNS), 80 (HTTP), 123 (NTP), 443 (TLS/SSL), 30303, and 3389 (RDP). For each of these ports, the feature constructor 404 or the feature aggregator 408 can aggregate five of the metrics to construct six features: "Direction" (incoming vs outgoing), "PPS In", "PPS Out", "BPS In", "Unique Flows".

The feature aggregator 408 may then generate aggregate features. Finally, the feature aggregator 408 can also use the total number of bytes sent/received and the total number of incoming/outgoing connections as additional features to combine with the features described above.

The evaluation agent 224 can employ a random forest (RF) for evaluation of the VMs. RF is an ensemble learning method for classification that requires the tree generator 416 to construct a large set of decision trees at training time. At run-time, RFs output the predicted class of a threat by taking the mode or mean prediction of the individual trees. RFs also can output the fraction of trees that predicted each label. We use this fraction as a score to measure the degree of confidence and to control the false positives of the evaluation agent 224. The evaluation agent 224 use these scores to make decisions about what actions to take on a VM 204. The tree generator 416 can set the max depth of the trees in the RF and the number of estimators by running Bayesian parameter optimization on the training set of data/features. RFs are a natural first choice for binary classification, e.g., due to their explainability, high accuracy, and resilience to overfitting.

Figure 5:
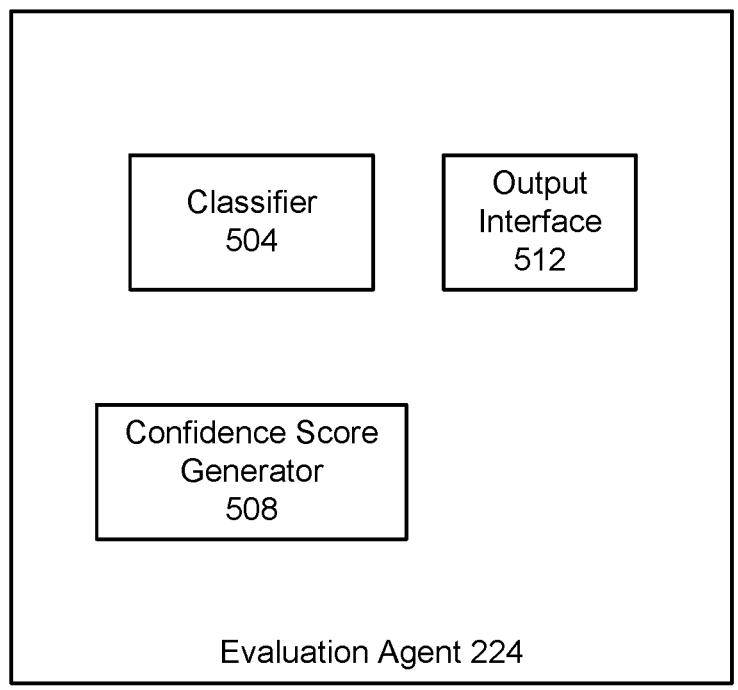
FIG. 5 illustrates an evaluation agent for analyzing data on traffic flow patterns for virtual machines in the data center to identify compromised VMs in accordance with the aspects of the disclosure.
Figure 6A:
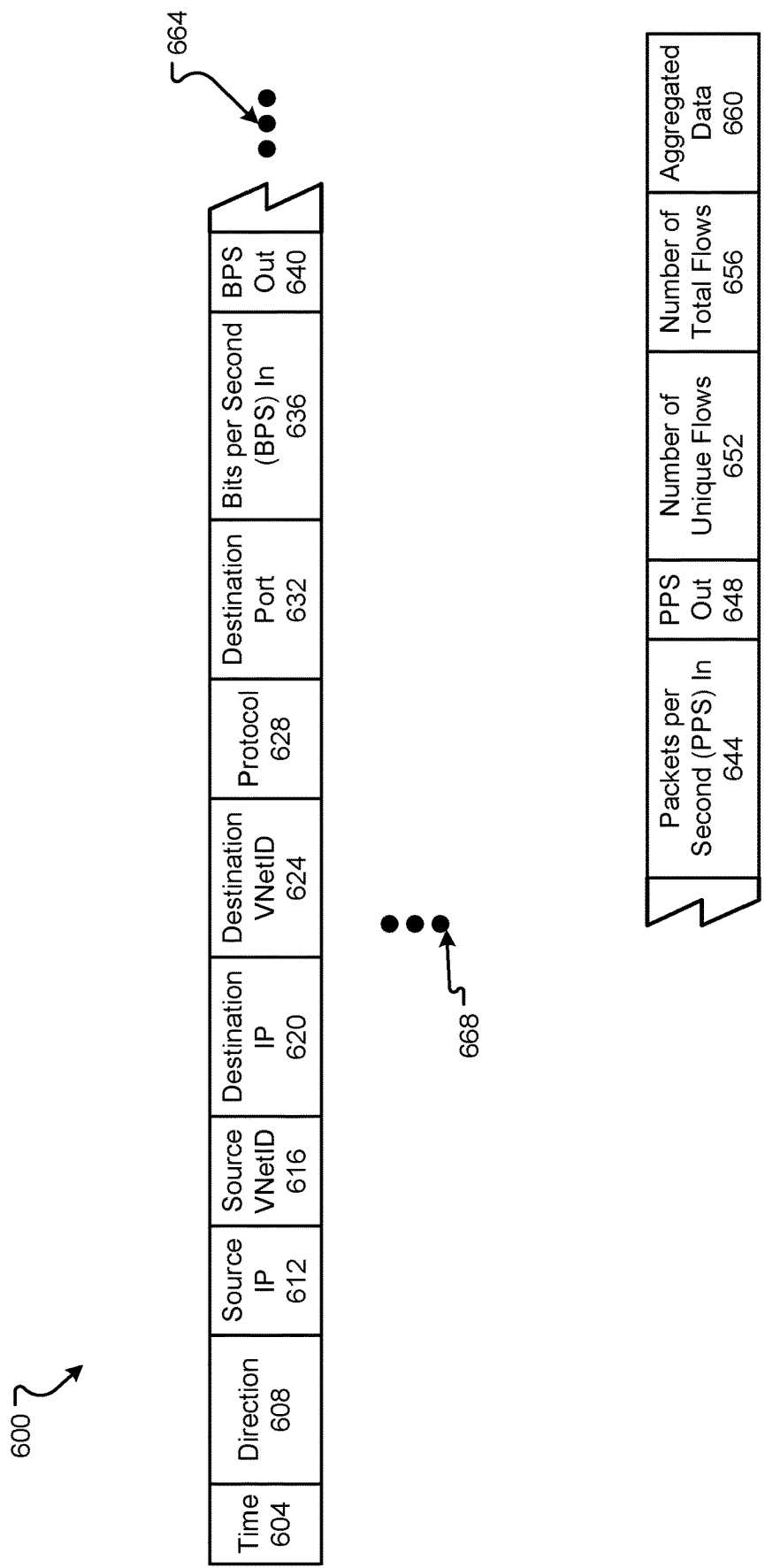
FIG. 6A illustrates a data structure compromising at least some of the data associated with traffic flow patterns for virtual machines in the data center in accordance with the aspects of the disclosure.
Figure 6B:
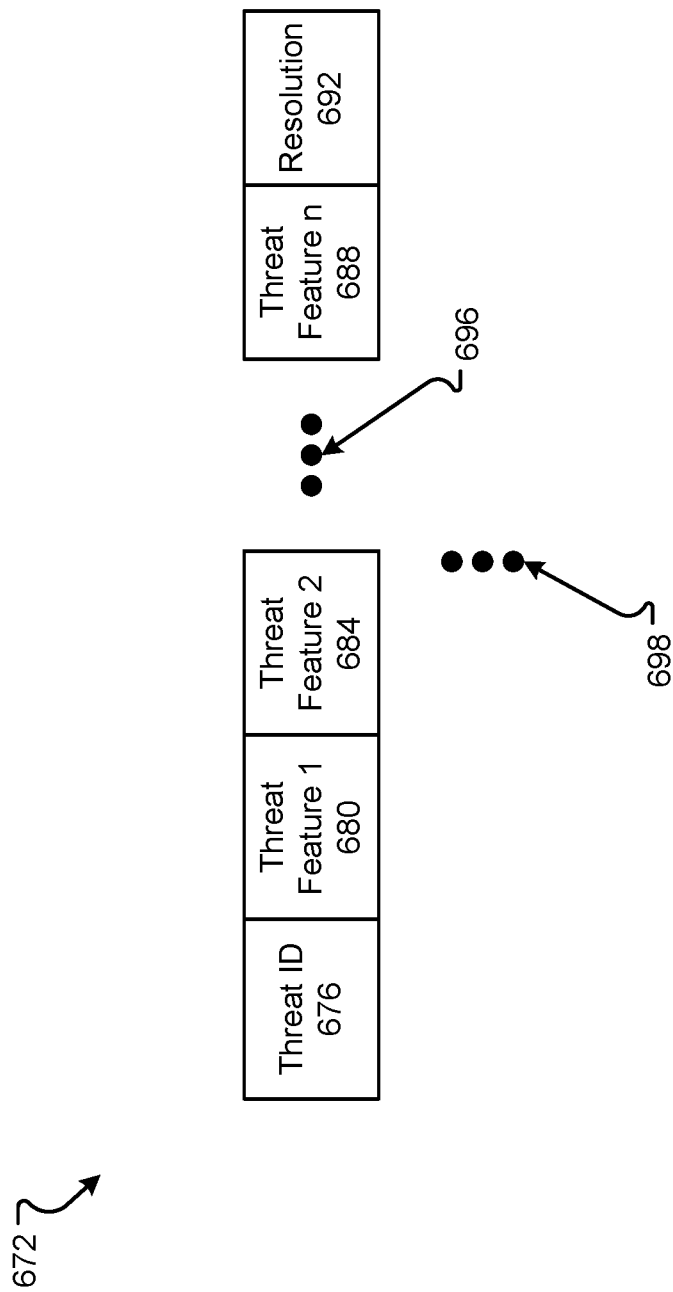
FIG. 6B illustrates a data structure compromising at least some of the threat features characterized by the analysis agent in accordance with the aspects of the disclosure.

Evaluation Agent:

In embodiments, the evaluation agent 224 may be a shown in FIG. 5. The evaluation agent 224 can include one or more the following, but is not limited to: a classifier 504, a confidence score generator 508, and an output interface 512. The classifier 504 can provide for the analysis of presently running virtual machines 204 to determine which of those machines 204 may be compromised. As explained herein before, the evaluation may include a random forest analysis using evaluation trees created by the trainer 402. Optionally, the classifier 504 may, in some configurations, provide for what type of compromise was observed based on previous evaluations.

Based on one or more evaluation tree indications, a confidence score may be created, by the confidence score generator 508, to determine the level of compromise or the likelihood of compromise of the VM 204. The score may also indicate what type of mitigation may be required. This information may then be provided to the output interface 512.

The output interface 512 may then either send the information about the compromised virtual machine 204 to the VM users or to an IT professional for response. Thus, the output interface 512 can execute automated mitigation by changing the characteristics of execution for the VM 204, such as, placing a virtual machine 204 in a sandbox or shutting down the virtual machine 204 if the indication of the compromise is at some threshold. In other embodiments, an indication of the compromise may be provided to a user interface so a human user can respond to the threat analysis. In other configurations, the output interface 512 can provide identification information of the possible compromised virtual machine 204 to a another analysis structure or device that can perform more in-depth analysis based on some standard or policy as provided by the owner of the virtual machine 204 and/or the data center.

Collected Data:

An embodiment of a data structure 600 for storing collected data, as stored by the data collector 308 and/or data aggregator 312, may be a shown in FIG. 6A. The data structure 600 may include more or fewer fields than those shown in FIG. 6A, as represented by ellipses 664. Further, there may be a set of collected data for each virtual machine 204 and there may be more than one data structure 600 in the HFDS distributed store 216, as is represented by ellipses 668. The data structure 600 can include one or more of the following, but is not limited to: a time field 604, a direction field 608, source IP information 612, source VNetID information 616, destination IP information 620, destination VNetID information 624, protocol information 628, destination port information 632, bytes per second (BPS) in information 636, BPS out information 640, packets per second (PPS) in information 644, PPS out information 648, number of unique flow 652, number of total flows 656, and/or aggregated data 660. Alternatively, bytes per second in or out may be used in fields 636, 640.

Time information 604 can indicate the time and/or time period indicating when the data was collected. Thus, the time field 604 can include a day, hour, minute, etc. when the data was collected. Further, the time field 604 can indicate the duration of evaluation for the period, for example, 10 seconds, 10 minutes, 1 hour, etc. This time information 604 indicates the nature of the behavior of each virtual machine 204 over the course of time and may be used to evaluate changes from one time period to the next to generate temporal features as described above.

The direction field 608 can indicate a flow source and destination or an indication of whether a flow is into the virtual machine 204 or out of the virtual machine 204. Thus, for each flow there may be direction information 608.

The source IP information 612 can provide an IP address or some type of indicator of the source of a flow within the virtual machine 204. The source IP information 612 may also identify external nodes 112 or another node 104n within the data center based on the direction of flow provided in direction field 608.

The source VNetID information 616 can identify the virtual network of the source providing the communication flow whether the VM 204 of other node. The VNetID information 616 can be any type of identifier including, but not limited to a numeric ID, an alphanumeric ID, a globally unique ID (GUID), etc. Thus, the VNetID information 616 and source IP information 612 can identify the communication source for any of the traffic flows into or out of the virtual machine 204.

The destination IP information 620 can provide similar information to the source IP information 612 but represents the destination of the flow. The destination IP information 620 can include an IP address of where a traffic flow was sent or received based on the direction information 608. Similarly, the destination VNetID 624 also provides a network ID for the virtual network that received the information. This destination VNetID 624 can be a virtual network within the data center or maybe an external network. The ID 612, 620 and VNetID information 616, 624 help to construct the IP and spatial based features described above.

The protocol information 628 can provide the protocol for the communication. The protocol 628 can be any type of protocol as those described above or other protocols as understood in the art. This protocol 628 is provided to have an indication of protocol changes made that are abnormal for the virtual machine 204 and help create the IP-based features described above.

The destination port 632 can indicate which port was used in receiving/sending the communication. The port information 632 helps generate the port-based features described above. The BPS in field 636 is an indication of the number bits (or bytes) being received by the virtual machine. Similarly, the BPS out field 640 is an indication of how many bits (or bytes) are being sent by the virtual machine 204. The related PPS in information, in field 644, indicates a number of packets that were received during the time period. The PPS out information, in field 648, indicates a number of packets that were sent during the time period. The packet size may change depending on the protocol 628, and therefore, both the packet data and bit data is helpful in analyzing the VMs 204.

The number of unique flows 652 is an indication of new traffic flows that may have been newly-identified as a characteristic of the virtual machine 204. These unique flows may be indications based off of past data structures 600 that are now unique to the current configuration or have not been used by the virtual machine 204 in the past. The number of total flows 656 can be an indication of the number of data streams being sent in and/or out of the virtual machine 204. This total number of flows 204 can include the unique flows and can indicate a change in the number of streams being provided in or out of the virtual machine 204.

The aggregated data field 660 may be created by the feature aggregator 408. The aggregated data field 660 can include the aggregation two or more of the features indicated hereinbefore. The aggregation can store the features together, within the aggregated data field 660, or may indicate a aggregation by a set of pointers and an identifier for the aggregation. Thus, the aggregated data field 660 can indicate which aggregations should be analyzed or what may be more pertinent for this virtual machine 204. The aggregated data may be as previously described.

Threat Features:

An embodiment of a data structure 672 for storing threat features may be as shown in FIG. 6B. The data structure 672 can include one or more of the following, but is not limited to: a threat identifier (ID), threat feature 1 680, threat feature 2 684, threat feature n 688, and/or a resolution field 692.

The threat identifier 676 can be any type of numeric, alphanumeric, GUID, or other type of identifier. This identifier 676 may identify the type of threat or a unique set of features that were witnessed with a compromised virtual machine 204. Thus, each type of threat or different type of compromise of a virtual machine 204 may have a data structure 672 with a unique ID 676. Thus, there may be more data structures 676, within the HDFS distributed store 216, as stored by the AA 208, as represented by ellipses 698. Each of the threats identified in field 676 may have a set of threat features.

Threat feature 680 through 688 provide what type of features or characteristics of a compromise may have been previously-identified or characterized by the data in data structure 600. For example, if there is an increase of BPS in field 636, that change may be one feature stored in the threat feature 1 field 680. Likewise, if a new source IP 612 is identified, that new source IP 612 may be stored as threat feature 2 684. Thus, the various threat features, such as those described above, may be stored as threat features 680 through 688. There may be more or fewer threat features than that shown in data structure 672, as is represented by ellipses 696. Further, there may be more or fewer fields than those shown in data structure 676, which may be represented by ellipses 696. The threat features 608-688 can provide indications of changes over time that indicate a compromise in the VM 204. Thus, the threat features 608-688 may indicate how changes occur with compromised VMs 204 and how to identify those changes to determine other compromised VMs 204.

Resolution field 692 may indicate, for this threat, what type of mitigation or actions the evaluation agent 224 is to execute. For example, if the virtual machine 204 is to be quarantined and not allowed to communicate with other virtual machines 204 within the data center, that indication may be provided in the resolution field 692. The resolution field 692 may thus authorize the compromise detection system 200 to automatically quarantine a virtual machine 204. If the resolution is to provide some type of user interface output, the information for how to present that user interface and where that user interface is to be displayed may be provided in the resolution field 692.

In some configurations, the compromise detection system 200 may use data 600 from production DCs from different cloud providers or from other detection products executing in the environment 100. The data 600 can be labeled with detections from 1st and 3rd-party detectors, from across all DCs, for a particular geographic area, for a particular time, etc. Each data point 600, in a dataset, can correspond to a VM 204 in a time period, and may be labeled compromised (C) or legitimate (L). Imbalance in the small number of compromised VMs 204 compared to the legitimate VMs 204 may lead to a classifier 504 with high false negatives—for example, the classifier 504 may classify a VM 204 as legitimate while still achieving high accuracy. As typical in such situations, the classifier 504 can use downsampling: the classifier 504 randomly samples the set of L VMs 204 to create a dataset where the ratio of C to L VMs is more optimal, for example 7%.

Figure 7:
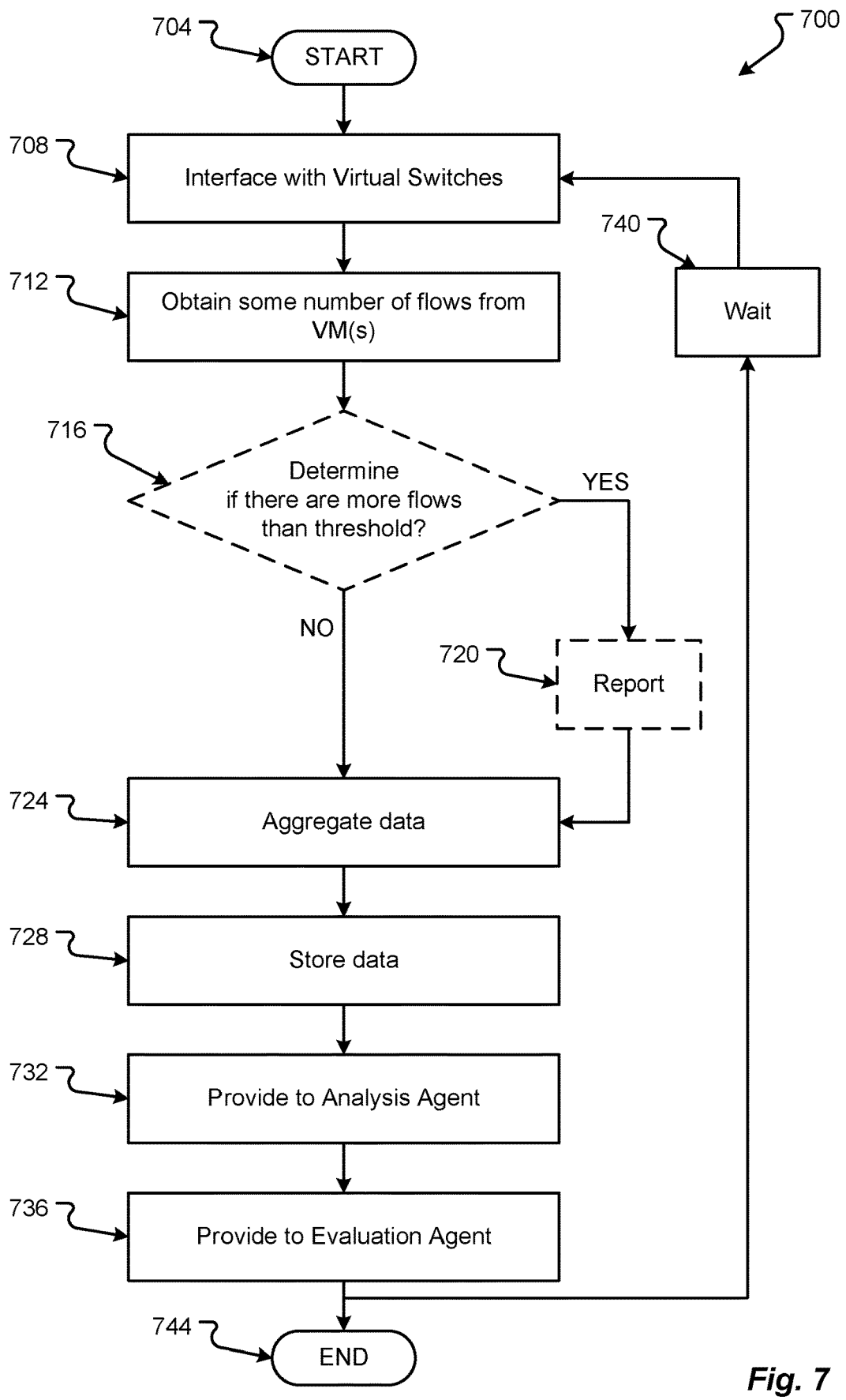
FIG. 7 illustrates a method for collecting data on traffic flow patterns for virtual machines in the data center in accordance with the aspects of the disclosure.

Data Collection Method:

A method 700 for collecting data from the vSwitch 206 in a data center may be as shown in FIG. 7. A general order for the steps of the method 700 is shown in FIG. 7. Generally, the method 700 starts with a start operation 704 and ends with an end operation 744. The method 700 can include more or fewer steps or can arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, an application specific integrated circuit (ASIC), a field programmable gate array (FPGA), a system-on-a-chip (SOC), or other hardware device. Hereinafter, the method 700 shall be explained with reference to the systems, devices, components, modules, software, data structures, methods, etc. described in conjunction with FIGS. 1-6 and 8-13.

The collection agent 212 can interface with the vSwitch 206, in step 708. The virtual switch interface 304 can interface with the vSwitch 206 periodically to obtain a network traffic data flow summary. The periodicity of the interface can be determined by the amount of data that is needed for the analysis agent 208. If there is not enough data, the period may be longer; however, if there is too much data, the period can be shorter. An example period for the interface may be 10 seconds. The interface can include any authentication or handshaking required to connect the vSwitch 206 to the collection agent 212 to allow the collection agent 212 to begin obtaining data.

The virtual switch interface 304 may then obtain some number of flows or information about the one or more virtual machines 204 from the vSwitch 206, in step 712. The number of flows can be, for example, 5000 flows in the time period between virtual switch interface 304 interface with the vSwitch 206 or for the analysis duration. There may be more or fewer number of flows obtained by the collection agent 212 depending on the needs of the analysis agent 208 and the amount of data being produced.

The data flow summary information about the number of flows may then be checked against a threshold, in optional step 716. The virtual switch interface 304 can compare the number of flows received to the threshold. If there are more flows than the threshold, the method proceeds YES to step 720 where the vSwitch 206 can generate a measure that indicates how many flows were over the threshold and other information about the overage. The additional flows are not aggregated or stored, but simply reported as an overage (possibly with data describing the overage, e.g., number of flows over the threshold, etc.), in step 720. If there are not more flows than the threshold, the method proceeds NO to step 724.

The data collector 308 may then collect the data from the flows. The data aggregator can likewise aggregate that data, in step 724. Data aggregation includes any steps used to consolidate the data into the data structure 600, as described above. Thus, the data collector 308 can generate the data structure 600, creating the various fields 604 through 660, to store data into data structure 600. As there may be more data than what is needed or that can be managed, the data aggregator 312 may condense the data. The data aggregator 312 can consolidate the data into summary information, other data forms, etc. to shrink or consolidate the size of the data structure 600.

This data structure 600 is then stored, by the data collector 308, into the HDFS distributed store 216, in step 728. This store 216 of the data allows for the AA 208 to retrieve the data as necessary when evaluating the virtual machines 204. Thus, the HDFS distributed store 216 can provide the data to the AA 208, in step 732. In some configurations, the collection agent 212 can send the data 600 directly to the AA 208 and/or to the evaluation agent 224. However, the evaluation agent 224 may also retrieve the data from the HDFS distributed store 216, in step 736. Thus, the AA 208 can receive past flow data to train the evaluation agent 224 to identify compromised virtual machines 204, while the evaluation agent 224 can retrieve the data to identify the compromised virtual machines 204.

Figure 8:
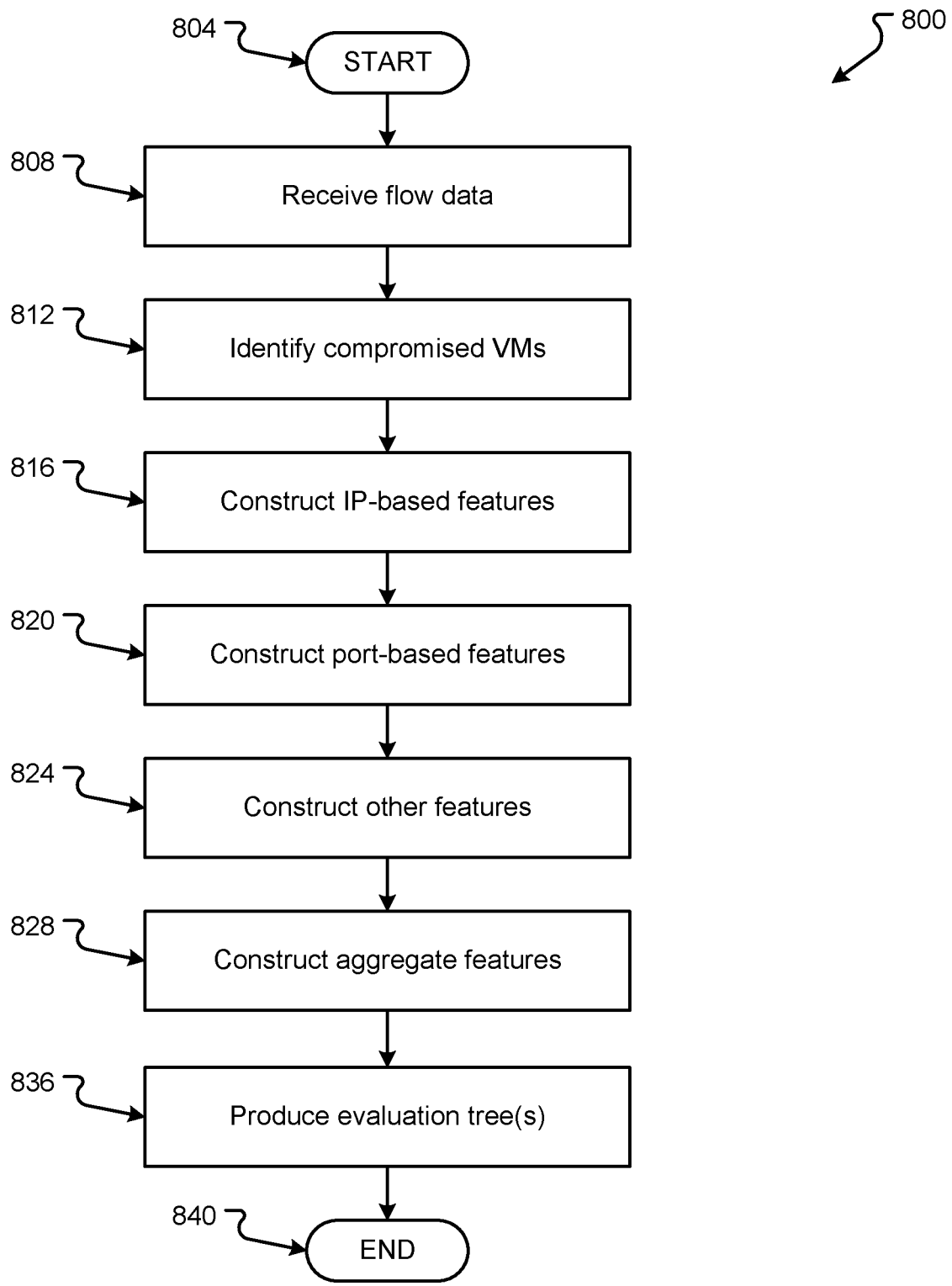
FIG. 8 illustrates another method for analyzing data on traffic flow patterns for virtual machines in the data center in accordance with the aspects of the disclosure.

Feature Creation Method:

A method 800 for analyzing data from the virtual switch in a data center to create feature profiles for corrupt virtual machines may be as shown in FIG. 8. A general order for the steps of the method 800 is shown in FIG. 8. Generally, the method 800 starts with a start operation 804 and ends with an end operation 840. The method 800 can include more or fewer steps or can arrange the order of the steps differently than those shown in FIG. 8. The method 800 can be executed as a set of computer-executable instructions executed by a computer system and encoded or stored on a computer readable medium. Further, the method 800 can be performed by gates or circuits associated with a processor, an ASIC, a FPGA, a SOC, or other hardware device. Hereinafter, the method 800 shall be explained with reference to the systems, components, devices, modules, software, data structures, user interfaces, methods, etc. described in conjunction with FIGS. 1-7 and 9-13.

The analysis agent 208 receives flow data, in step 808. The flow of data may be as collected, by the collection agent 212, as is described in conjunction with method 700 described in conjunction with FIG. 7. Flow data may be received directly from the collection agent 212, the vSwitch 206, or retrieved from the HDFS distributed store 216. Flow data can be a summary of information as is described in conjunction with the data structure 600 described in conjunction with FIG. 6 and above.

The feature constructor 404 of the analysis agent 208 can receive the flow data. Further, the feature constructor 404 can interface with one or more virtual machines 204 and other agent-based systems to identify which of the test machines 204 are currently compromised or previously compromised, in step 812. Thus, the feature constructor 404 uses the identification for previously-compromised VMs 204 to determine data flows or changes to those flows associated with the compromise. The identification of compromised virtual machines 204 may be done by other agent-based analysis systems on VMs 204 that allow for access to private data or from the data center's own virtual machines 204. As such, the feature constructor 404 has access to at least some of the virtual machines operating in the data center. From this information, and from other analysis, the feature constructor 404 can identify virtual machines 204 to be inspected for features of network flow patterns that change or occurred due to the compromise.

There is no need to store the private data from these compromised VMs 204. The AA 208 can anonymize private data, e.g., IP addresses during analysis. The features 680-688 evaluate the changes of flow patterns rather than specific private information, e.g., IP addresses, to determine compromise, which means private data is not used in identifying compromised VMs 204 either. Regardless, private information that may be used in the processes herein may be provided by the data centers own VMs 204 or from VMs where the user provides consent. After developing the features 680-688, the private data can be purged from storage.

From the labels generated from the previously-compromised virtual machines 204, the feature constructor 404 can then construct IP-based features for that compromised VM, in step 816. IP-based features indicate both IP source, VNetID, and other information about the Internet protocol communication information for the compromised VM. This information may be extracted from fields 612 through 628 and from fields 636 through 652/656. This information indicates to whom and from where different communication flows are occurring and can identify how flows change for the compromised virtual machine 204. The IP-based features may be as described above.

The feature constructor 404 can also identify any port-based features indicating compromised virtual machine 204, in step 820. The port-based features are indicative of information in field 632 of data structure 600. Thus, if the ports used to receive or send information change, the feature constructor 404 can use those port-based features to identify compromised VM 204. The port-based features may be as described above.

The feature constructor 404 can also construct other features as necessary, in step 824. Thus, the feature constructor 404 analyzes various traffic flow patterns of compromised virtual machines 204 and can be retrained to construct other features that characterize the data flow pattern or signature of a compromised VM 204. These other features may come from data already shown in data structure 600, may come from data not yet identified in data structure 600, etc. Some possible other features may be as described above. The constructed features may then be stored or placed into the data structure 672.

The feature aggregator 408 may then construct aggregate features, in step 828. The feature aggregator 408 looks for combinations of various raw data (or, in some configurations, features) in data structures 600 and/or 672 or from aggregated data 660. These aggregate features combine two or more into a single signature. For example, an aggregate feature can include the joining of or the sum of the BPS and PPS either in or out of the VM. The aggregated features may also have a set of pointers to the various raw data and/or features and a type of aggregation ID. The aggregated features allow for more comprehensive analysis of the various data and data structure 600. The aggregated feature information may then also be stored, by the feature aggregator 408, in data structure 672.

The tree generator 416 may then generate evaluation trees for random forest analysis, in step 836. The evaluation trees may be used for as a ML model or for analysis purposes by the evaluation agent 420. These evaluation trees may then be stored for access by the evaluation agent 420.

Figure 9:
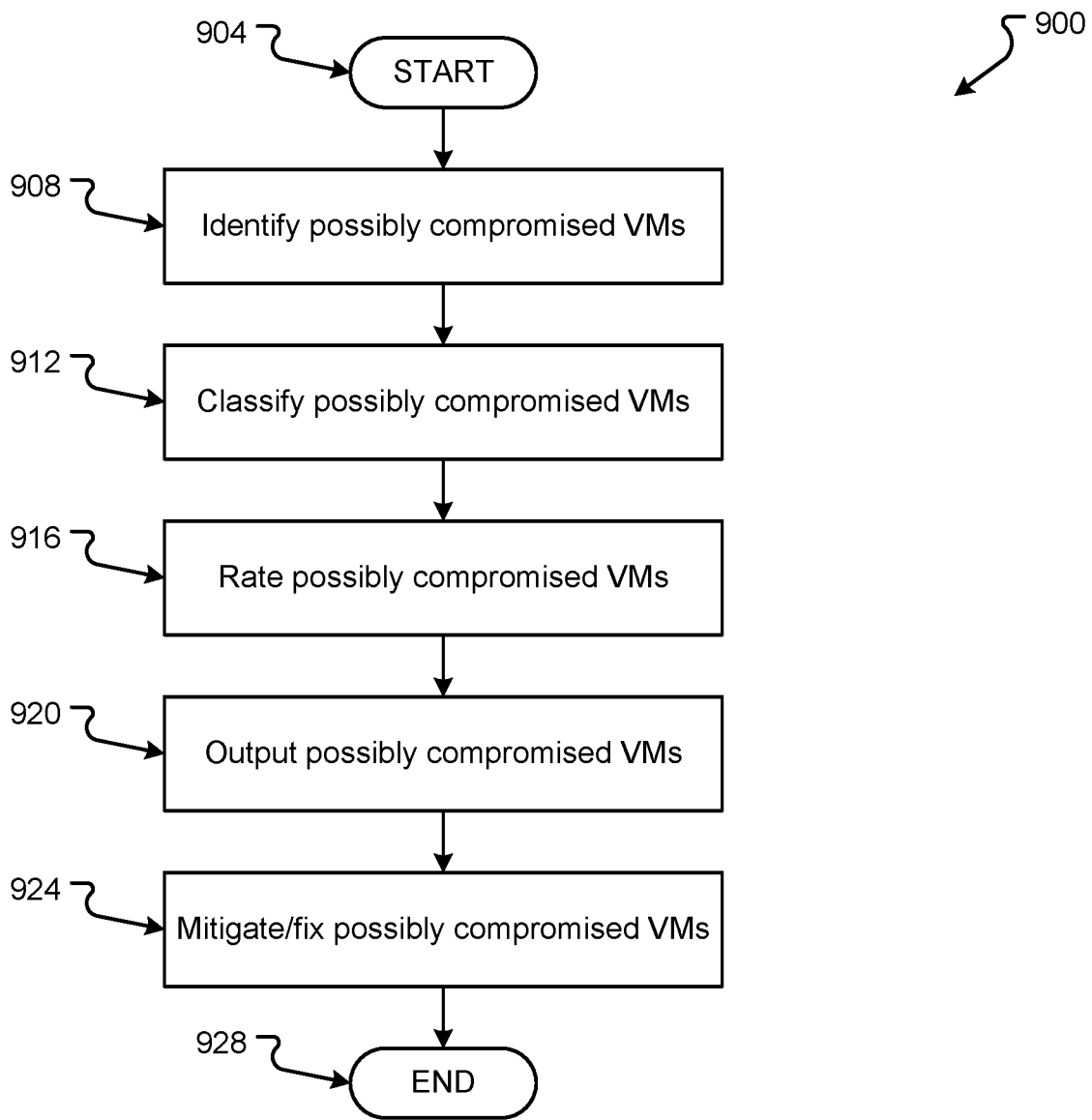
FIG. 9 illustrates another method for analyzing data on traffic flow patterns for virtual machines in the data center to identify compromised VMs in accordance with the aspects of the disclosure.

Evaluation Method:

A method 900 for evaluating data from the virtual switch in a data center to identify and resolve issues with compromised VMs 204, may be as shown in FIG. 9. A general order for the steps of the method 900 is shown in FIG. 9. Generally, the method 900 starts with a start operation 904 and ends with an end operation 928. The method 900 can include more or fewer steps or can arrange the order of the steps differently than those shown in FIG. 9. The method 900 can be executed as a set of computer-executable instructions executed by a computer system and encoded or stored on a computer readable medium. Further, the method 900 can be performed by gates or circuits associated with a processor, an ASIC, a FPGA, a SOC, or other hardware device. Hereinafter, the method 800 shall be explained with reference to the systems, components, devices, modules, software, data structures, user interfaces, methods, etc. described in conjunction with FIGS. 1-8 and 10-13.

The classifier 504, of the evaluation agent 420, can identify possibly compromised VMs 204, in step 908. The classifier 504 can execute random forest analysis with collected data from a collection agent 212, vSwitch 206, that is received from virtual machines 204 and/or the HDFS distributed store 216. The random forest algorithm traverses one or more evaluation trees to determine if the communication patterns of the virtual machine 204 are similar to communication patterns or features in the data structure 672, which characterizes past compromised virtual machines 204. If there are enough similarities, the virtual machine 204 is identified as possibly compromised and this information is passed to the confidence score generator 508. It should be noted that there are many other machine learning techniques that may be used to identify compromised VMs 204, which can include anomaly detection, breakout detection algorithms, K-means, logistic regression, shallow neural networks, deep neural networks, Naive Bayes, etc.

The confidence score generator 508 can then classify the possibly compromised virtual machines 204, in step 912. Determining a confidence score by the confidence score generator 508 can include a determination of the number of trees that identified the VM 204 as compromised compared to the number of trees that did not identify the VM 204 as compromised. In other configurations, classification of the virtual machines 204 may include determining the type of possible compromise based on the threat ID 676 and threat features 680 through 688. The classification determines the type of threat to the virtual machine 204 and the data center in general. Further, the type of threat indicates, in data structure 672, what the evaluation agent 224 can do for mitigation purposes.

The confidence score generator 508 may also rate the amount of or likelihood of compromise, in step 916. This rating can include the likelihood that the virtual machine 204 is compromised. For example, a confidence score above some predetermined threshold determines the amount of confidence in the identification of the virtual machine 204 as compromised. In some alternative configurations associated with multiclass outputs, the confidence score can indicate the type of compromise, e.g., compromised, non-compromised, malware, coin mining, spam, denial of service, etc. Further, with the multiclass outputs, the confidence score can also indicate what type of mitigation is needed in the resolution field 692.

The confidence score generator 508 passes the threat information from data structure 672 and other information to the output interface 512. The output interface 512 can output a signal or indication of the possibly compromised virtual machine, in step 920. The output indication of the possibly compromised virtual machine includes any type of indication directed by the resolution field 692. The output can include a display to a user interface or other indication to a VM user or DC employee. The mitigation field 612 may direct the output interface 512, for example, to forward information about the possibly compromised VM to another type of analysis system or device that can further inquire as to whether the virtual machine 204 is compromised or operating properly. As such, user permission to investigate the virtual machine may be needed or asked for by the output interface 512. In other configurations, the output interface 512 outputs the identity of the VM 204 to a mitigation system.

The virtual machine 204 that is compromised can cause issues with the data center and may require automatic mitigation or repair, in step 924. Here, the output interface 512 may interact with a mitigation system, for example, a sandbox or other type of quarantine process that can isolate the compromised virtual machine 204. The isolation of the virtual machine 204 ensures that the virtual machine 204 cannot communicate with other virtual machines 204 or other components of the data center further causing harm to the data center. In other configurations, the compromised virtual machine 204 may be deleted or its execution may be stopped to prevent any type of harm. This type of mitigation may require user involvement and information communicated to an owner of the virtual machine 204 to mitigate the virtual machine's harm on the data center.

Figure 10:
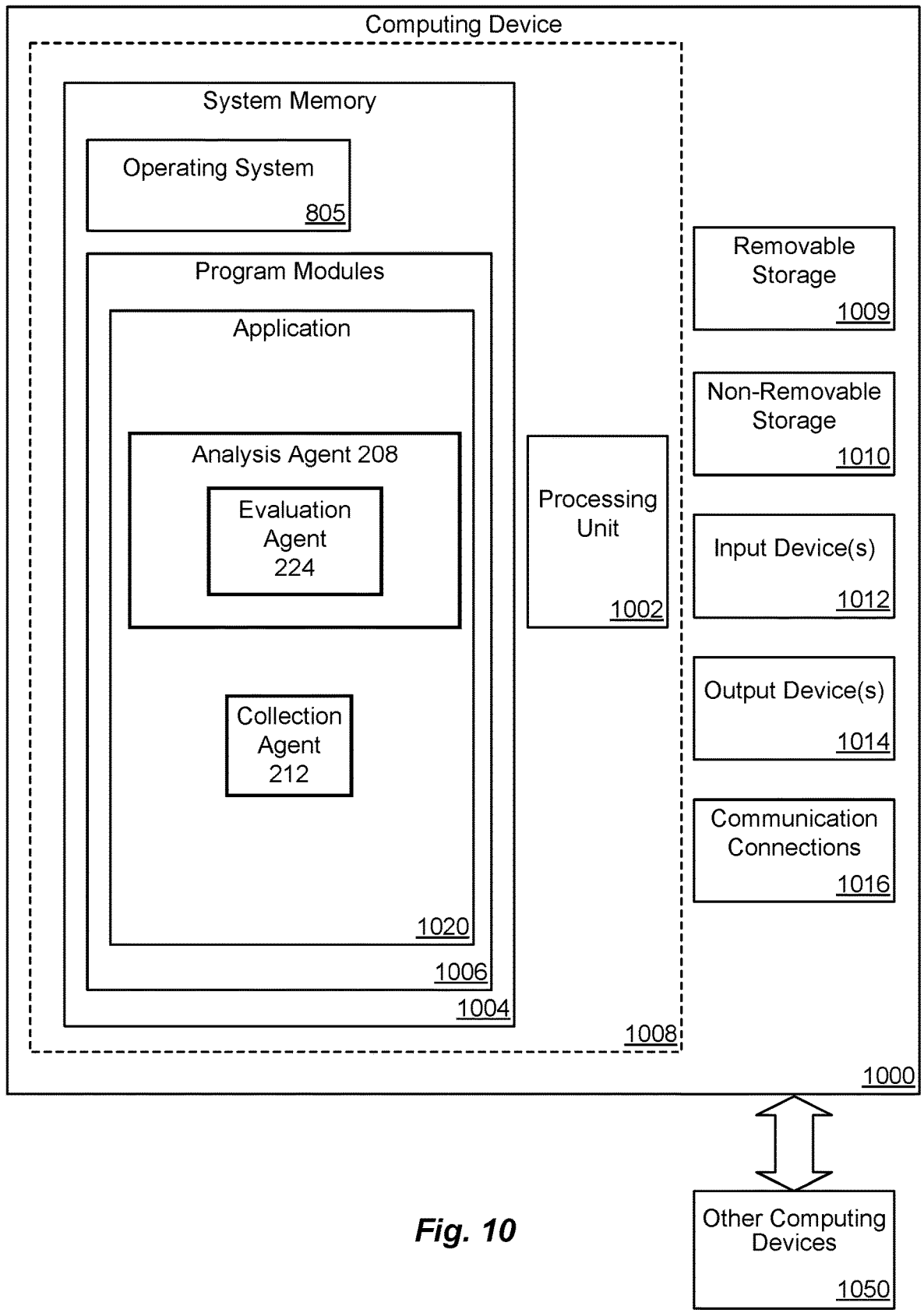
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may be suitable for the computing devices described above. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1008 and one or more program modules 1006 suitable for performing the various aspects disclosed herein such as identity provider 1024 and attribute inference processor 1026. The operating system 1008, for example, may be suitable for controlling the operation of the computing device 1000. Furthermore, aspects of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., application 1020) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1080. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
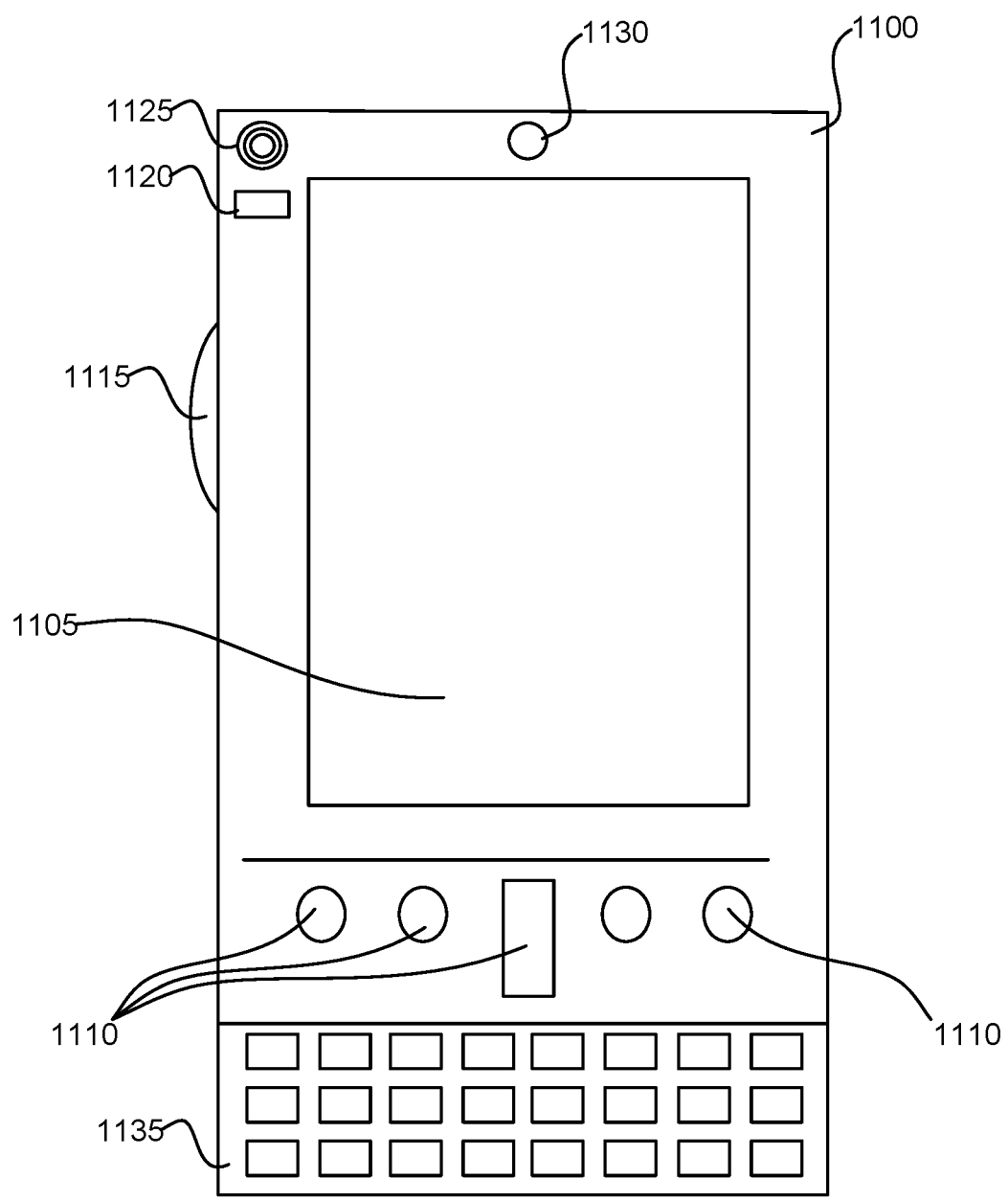
FIG. 11A is a simplified block diagram of a computing device with which aspects of the present disclosure may be practiced.
Figure 11B:
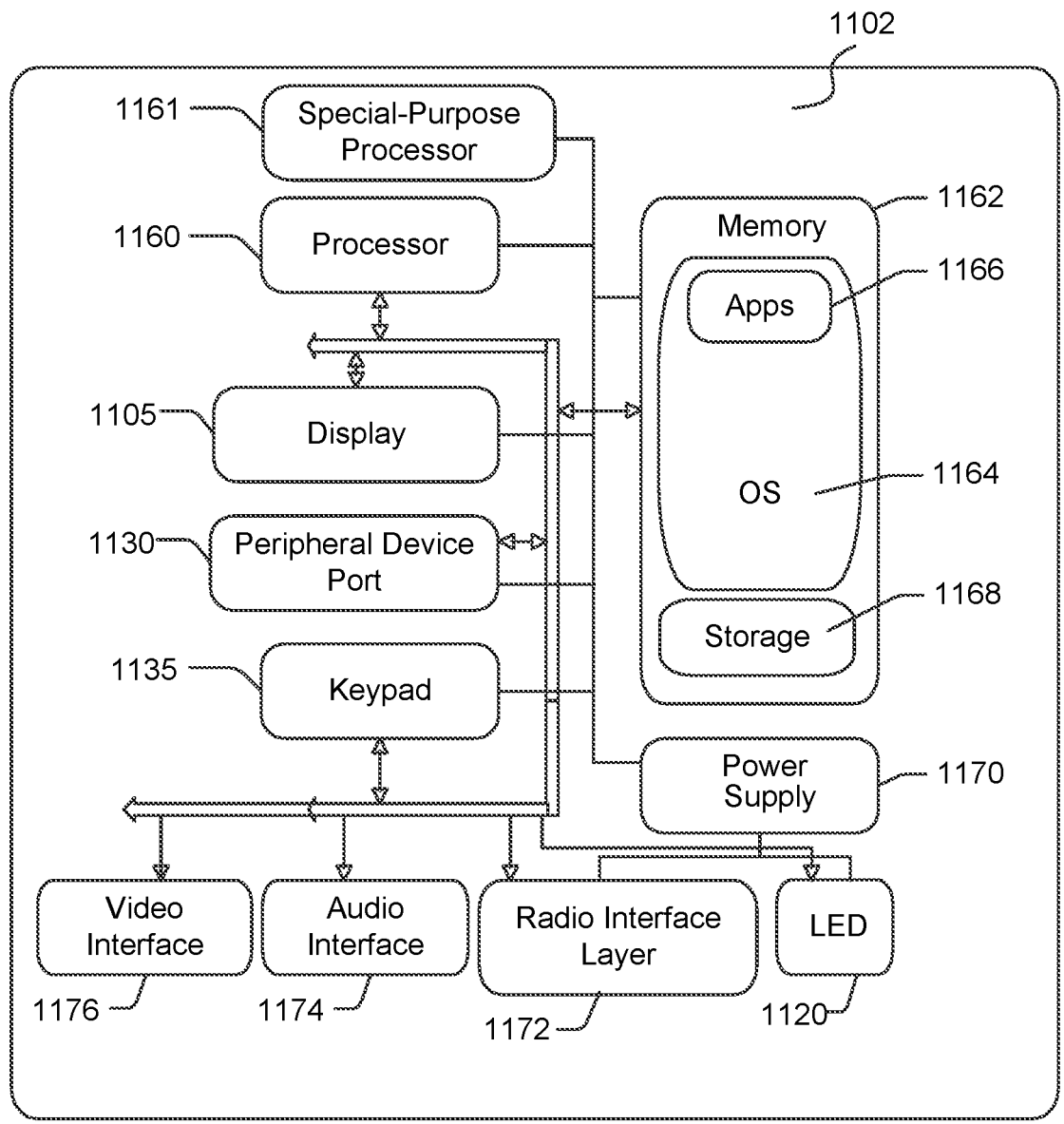
FIG. 11B is another are simplified block diagram of a mobile computing device with which aspects of the present disclosure may be practiced.

FIGS. 11A and 11B illustrate a computing device or mobile computing device 1100, for example, a mobile telephone, a smart phone, wearable computer (such as a smart watch), a tablet computer, a laptop computer, and the like, with which aspects of the disclosure may be practiced. In some aspects, the client (e.g., computing system 104) may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some aspects. In yet another alternative aspect, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various aspects, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of computing device, a server (e.g., server 112), or a mobile computing device. That is, the computing device 1100 can incorporate a system (e.g., an architecture) 1102 to implement some aspects. The system 1102 can implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein (e.g., search engine, extractor module, relevancy ranking module, answer scoring module, etc.).

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated configuration, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with aspects of the present disclosure, the microphone may also serve as an audio sensor to facilitate control of notifications, as will be described below. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
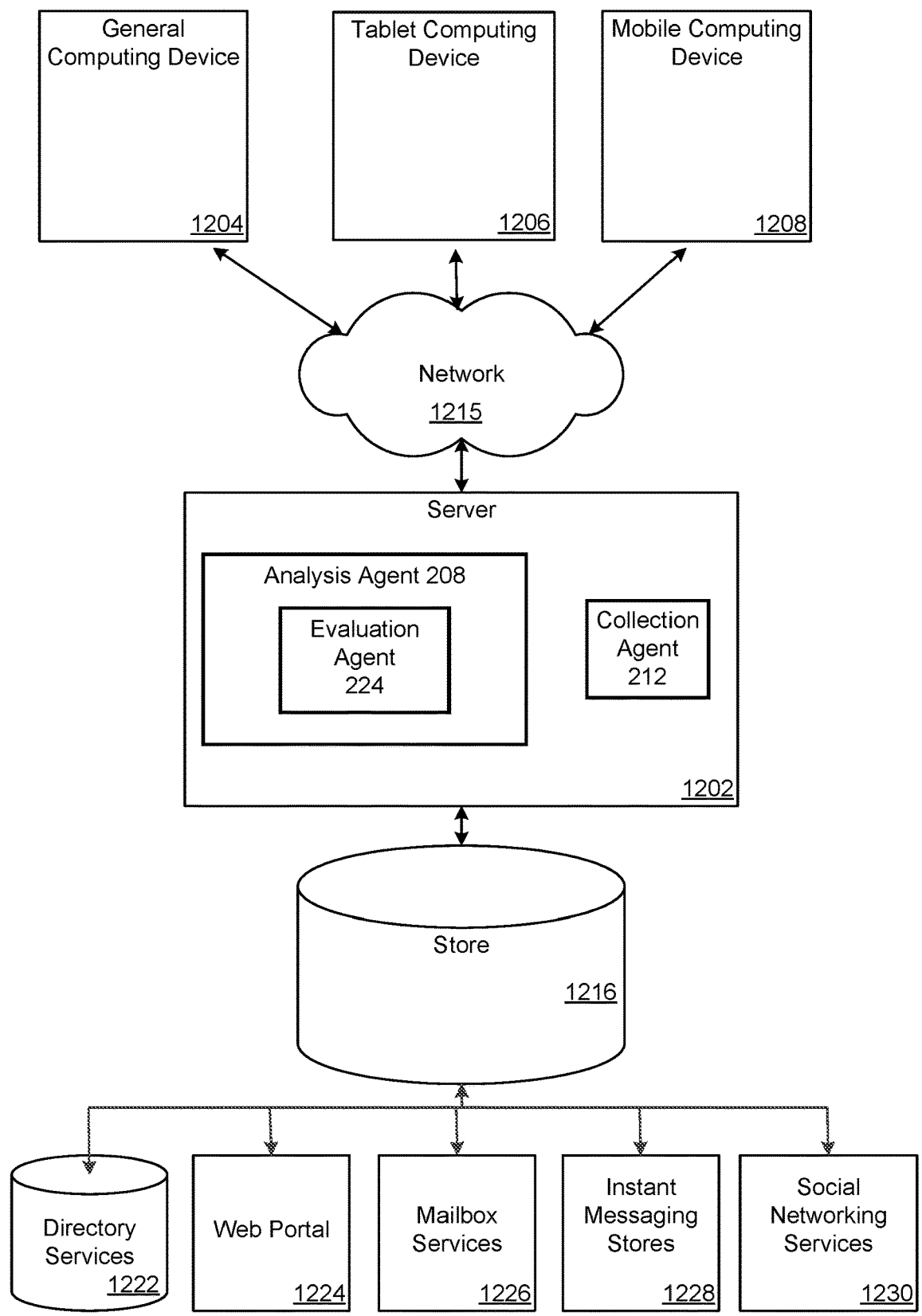
FIG. 12 is a simplified block diagram of a distributed computing system in which aspects of the present disclosure may be practiced.

FIG. 12 illustrates one aspect of the architecture of a system for processing data received at a computing system from a remote source, such as a personal computer 1204, tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking site 1230. Unified profile API 1221 may be employed by a client that communicates with server device 1202, and/or attribute inference processor 1220 may be employed by server device 1202. The server device 1202 may provide data to and from a client computing device such as a personal computer 1204, a tablet computing device 1206 and/or a mobile computing device 1208 (e.g., a smart phone) through a network 1215. By way of example, the computer system described above may be embodied in a personal computer 1204, a tablet computing device 1206 and/or a mobile computing device 1208 (e.g., a smart phone). Any of these configurations of the computing devices may obtain content from the store 1216, in addition to receiving graphical data useable to be either pre-processed at a graphic-originating system, or post-processed at a receiving computing system.

Figure 13:
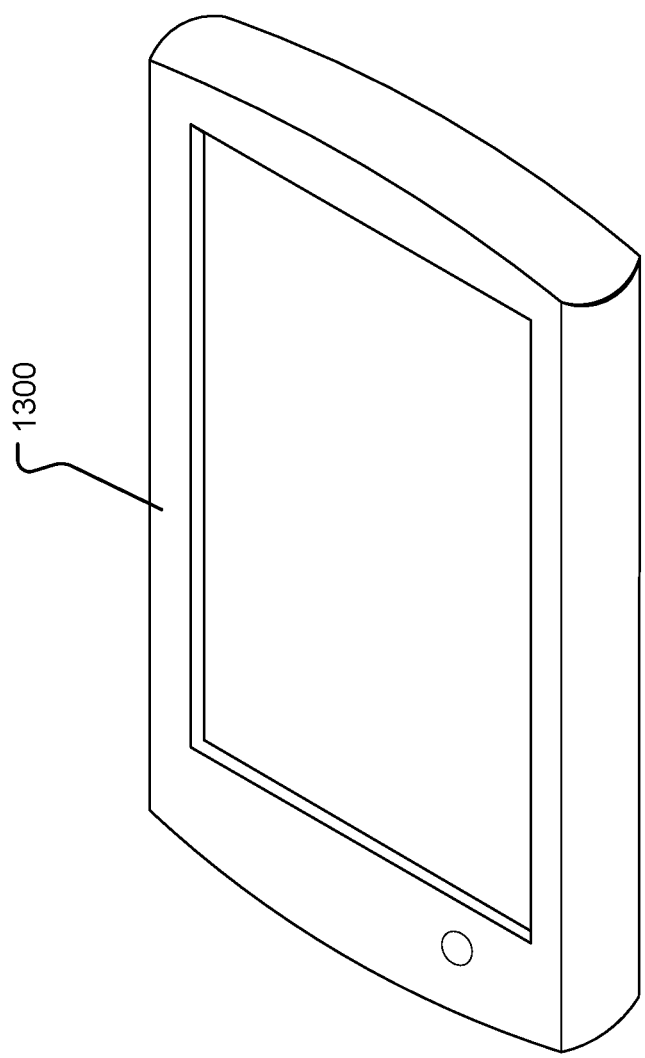
FIG. 13 illustrates a tablet computing device for executing one or more aspects of the present disclosure.

FIG. 13 illustrates an exemplary tablet computing device 1300 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an configuration with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure include a method comprising: receiving data flow information, from an interface between customer logic, being executed in a data center, and a data center network, wherein the data flow information characterizes a data flow pattern for the customer logic in a data center; identifying a compromised customer logic in the data center based on a comparison of the data flow pattern of the customer logic to a past data flow pattern for a previously-identified compromised customer logic; and mitigating a threat posed by the compromised customer logic in the data center by changing a characteristic of execution of the customer logic.

Any of the one or more above aspects, wherein the data flow information does not include private information.

Any of the one or more above aspects, wherein the past data flow pattern is characterized by a threat feature, and wherein the threat feature comprises one or more of an IP-based feature, a port feature, a temporal feature, a spatial feature, and/or an aggregated feature.

Any of the one or more above aspects, wherein the comparison is a random forest analysis of an evaluation tree.

Any of the one or more above aspects, wherein the method further comprises generating a confidence score that indicates a level of confidence that the customer logic is compromised.

Any of the one or more above aspects, wherein mitigating the customer logic includes placing the customer logic in a sandbox.

Any of the one or more above aspects, wherein the threat feature is generated from data flow information previously collected from the interface.

Any of the one or more above aspects, wherein the method further comprises: receiving a data flow summary from the interface including data about two or more flows of data associated with communications with the compromised customer logic; and storing the data in a data structure for analysis.

Any of the one or more above aspects, wherein the method further comprises: receiving the data flow summary; identifying the previously-identified compromised customer logic; constructing the past data flow pattern for the previously-identified compromised customer logic; and generating threat features to compare future data flows with the past data flow pattern for the previously-identified compromised customer logic.

Any of the one or more above aspects, wherein access to private data associated with the previously-identified compromised customer logic is allowed because the previously-identified compromised customer logic is a customer logic owned by the data center or a customer logic that a user authorized access to private data.

Aspects of the present disclosure further include a computer storage media having stored thereon computer-executable instructions that when executed by a processor cause the processor to perform a method, the method comprising: receiving, by a collection agent, a data flow summary from a virtual switch application (vSwitch) in communication with a virtual machine (VM) executed in a data center, the data flow summary including data about two or more flows of data associated with communications with a compromised VM; storing, by the collection agent, data from the data flow summary in a data structure in a distributed store; receiving, by an analysis agent, the data from the data flow summary from the distributed store; identifying, by the analysis agent, a previously-identified compromised VM; constructing, by the analysis agent, a past data flow pattern for the previously-identified compromised VM; generating, by the analysis agent, machine learning to train an evaluation agent to compare future data flows with the past data flow pattern for the previously-identified compromised VM; receiving, by the evaluation agent, new data flow information, from the vSwitch in communication with the VM, characterizing a data flow pattern for the VM in the data center; identifying, by the evaluation agent, the VM as compromised based on the a comparison of the data flow pattern of the VM to the past data flow pattern for the previously-identified compromised VM; and mitigating a threat posed by the compromised VM in the data center.

Any of the one or more above aspects, wherein the data flow information does not include private information.

Any of the one or more above aspects, wherein the past data flow pattern is characterized by a threat feature, and wherein the threat feature comprises one or more of a IP-based feature, a port feature, a temporal feature, a spatial feature, and/or an aggregated feature.

Any of the one or more above aspects, wherein the comparison is a random forest analysis of the evaluation tree.

Any of the one or more above aspects, wherein the method further comprises generating a confidence score that indicates a level of confidence that the VM is compromised.

Aspects of the present disclosure further include a data center, comprising: a memory storing computer executable instructions; a processor, in communication with the memory, wherein the processor reads the computer executable instructions from memory and when executing the computer executable instructions executes: two or more virtual machines (VMs); a virtual switch application (vSwitch) that communicates with the two or more VMs; a distributed store to store data for the data center; a collection agent, in communication with the vSwitch and the distributed store, that: receives a data flow summary from the vSwitch, wherein the data flow summary includes data about two or more flows of data associated with communications with a compromised VM; stores data from the data flow summary in a data structure in the distributed store; an analysis agent, in communication with the distributed store, that: receives the data from the data flow summary from the distributed store; identifies a previously-identified compromised VM; constructs a past data flow pattern for the previously-identified compromised VM; generates an analysis to train an evaluation agent to compare future data flows with the past data flow pattern for the previously-identified compromised VM; an evaluation agent, in communication with the analysis agent, the collection agent, the two or more VMs, and the distributed store, that: receives new data flow information from the collection agent, characterizing a data flow pattern for a VM in the data center; identifies the VM as compromised based on a comparison of the data flow pattern of the VM to the past data flow pattern for the previously-identified compromised VM; and mitigates a threat posed by the compromised VM in the data center.

Any of the one or more above aspects, wherein the data flow information does not include private information.

Any of the one or more above aspects, wherein the past data flow pattern is characterized by a threat feature, and wherein the threat feature comprises one or more of a IP-based feature, a port feature, a temporal feature, a spatial feature, and/or an aggregated feature.

Any of the one or more above aspects, wherein the analysis is an evaluation tree, and wherein the comparison is a random forest analysis of the evaluation tree.

Any of the one or more above aspects, wherein the method further comprises generating a confidence score that indicates a level of confidence that the VM is compromised.

Any one or more of the aspects as substantially disclosed herein.

Any one or more of the aspects as substantially disclosed herein optionally in combination with any one or more other aspects as substantially disclosed herein.

One or means adapted to perform any one or more of the above aspects as substantially disclosed herein.

What is claimed is:

1. A method comprising:
   receiving data flow information, from an interface between a first virtual machine (VM) being executed in a data center and a data center network, wherein the data flow information does not include private data;
   evaluating the data flow information to detect a first data flow pattern of the first VM;
   comparing the first data flow pattern to a second data flow pattern of a second VM owned by the data center, wherein the second VM was previously identified as a compromised VM, and wherein the second data flow pattern was detected based on evaluating at least some private data flow information of the compromised second VM;
   based on the comparison, determining that the first flow pattern of the first VM matches the second flow pattern of the compromised second VM;
   based on the matching, determining that the first VM is compromised; and
   mitigating a threat posed by the compromised first VM in the data center by changing a characteristic of execution of the first VM.

2. The method of claim 1, wherein the second data flow pattern is characterized by a threat feature, and wherein the threat feature comprises one or more of an IP-based feature, a port feature, a temporal feature, a spatial feature, or an aggregated feature.

3. The method of claim 2, wherein the threat feature is generated from data flow information previously collected from the interface.

4. The method of claim 3, wherein the method further comprises:
   receiving a data flow summary from the interface including data about two or more data flows associated with communications with the compromised second VM; and
   storing the data in a data structure for analysis.

5. The method of claim 4, wherein the method further comprises:
   receiving the data flow summary;
   identifying the previously-identified compromised second VM;
   constructing the second data flow pattern for the previously-identified compromised second VM; and
   generating threat features to compare future data flows with the second data flow pattern for the previously-identified compromised second VM.

6. The method of claim 5, wherein access to private data associated with the previously-identified compromised second VM is allowed because the previously-identified compromised second VM is a virtual machine owned by the data center or a virtual machine for which a user authorized access to private data.

7. The method of claim 1, wherein the comparison is a random forest analysis of an evaluation tree.

8. The method of claim 1, wherein the method further comprises generating a confidence score that indicates a level of confidence that the first VM is compromised.

9. The method of claim 1, wherein mitigating the first VM includes placing the first VM in a sandbox.

10. A computer storage media having stored thereon computer-executable instructions that when executed by a processor cause the processor to perform a method, the method comprising:
   receiving a data flow summary from a virtual switch application (vSwitch) in communication with a first virtual machine (VM) executed in a data center, the data flow summary including data about two or more data flows associated with communications with a compromised second VM;
   constructing a second data flow pattern for the compromised second VM, wherein the second data flow pattern was detected based on evaluating at least some private data flow information of the compromised second VM;
   training a model based on at least the second flow pattern of the compromised second VM using machine learning;
   in response to receiving new data flow information, from the vSwitch in communication with the first VM, characterizing a first data flow pattern for the first VM in the data center, wherein the new data flow information does not include private data;
   using the trained model to compare the first data flow pattern to the second data flow pattern;
   based on the comparison, determining that the first flow pattern of the first VM is similar to the second flow pattern of the compromised second VM;
   based on the similarity, determining that the first VM is compromised; and
   mitigating a threat posed by the compromised first VM in the data center.

11. The computer storage media of claim 10, wherein the second data flow pattern is characterized by a threat feature, and wherein the threat feature comprises one or more of an IP-based feature, a port feature, a temporal feature, a spatial feature, or an aggregated feature.

12. The computer storage media of claim 10, wherein the comparison is a random forest analysis of an evaluation tree.

13. The computer storage media of claim 10, wherein the method further comprises generating a confidence score that indicates a level of confidence that the first VM is compromised.

14. The computer storage media of claim 10, wherein mitigating the first VM includes placing the first VM in a sandbox.

15. The computer storage media of claim 10, the operations further comprising:
   generating threat features to compare future data flows with the second data flow pattern of the compromised second VM.

16. A data center, comprising:
   a memory storing computer executable instructions;
   a processor, in communication with the memory, wherein the processor reads the computer executable instructions from memory and when executing the computer executable instructions executes operations, comprising:
      receiving a data flow summary from a virtual switch application (vSwitch) in communication with a first virtual machine (VM) executed in a data center, wherein the data flow summary includes data about two or more data flows associated with communications with a compromised second VM;
      constructing a second data flow pattern for the compromised second VM, wherein the second data flow pattern was detected based on evaluating at least some private data flow information of the compromised second VM;
      training a model based on at least the second flow pattern of the compromised second VM using machine learning;
      in response to receiving new data flow information from the vSwitch, characterizing a first data flow pattern for the first VM in the data center, wherein the new data flow information does not include private data;
      using the trained model to compare the first data flow pattern to the second data flow pattern;
      based on the comparison, determining that the first flow pattern of the first VM is similar to the second flow pattern of the compromised second VM;
      based on the similarity, determining that the first VM is compromised; and
      mitigating a threat posed by the compromised firsts VM in the data center.

17. The data center of claim 16, wherein the second data flow pattern is characterized by a threat feature, and wherein the threat feature comprises one or more of an IP-based feature, a port feature, a temporal feature, a spatial feature, or an aggregated feature.

18. The data center of claim 17, wherein the trained model is an evaluation tree, and wherein the comparison is a random forest analysis of the evaluation tree.

19. The data center of claim 18, wherein the method further comprises generating a confidence score that indicates a level of confidence that the first VM is compromised.

20. The data center of claim 16, wherein mitigating the first VM-includes placing the first VM in a sandbox.

* * * * *